(12) United States Patent
Asano et al.

(10) Patent No.: US 8,900,086 B2
(45) Date of Patent: Dec. 2, 2014

(54) HYDRAULIC VEHICLE CLUTCH SYSTEM, DRIVETRAIN FOR A VEHICLE INCLUDING SAME, AND METHOD

(75) Inventors: Tetsushi Asano, Dublin, OH (US); Bobbie Burke, North Lewisburg, OH (US); Andrew J. Fox, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 614 days.

(21) Appl. No.: 12/847,786

(22) Filed: Jul. 30, 2010

(65) Prior Publication Data

US 2011/0021301 A1 Jan. 27, 2011

Related U.S. Application Data

(63) Continuation-in-part of application No. 11/832,849, filed on Aug. 2, 2007, and a continuation-in-part of application No. 11/832,860, filed on Aug. 2, 2007.

(60) Provisional application No. 61/301,884, filed on Feb. 5, 2010.

(51) Int. Cl.
*F16D 25/10* (2006.01)
*F16D 25/12* (2006.01)
*F16D 48/02* (2006.01)
*F16D 48/06* (2006.01)

(52) U.S. Cl.
CPC .............. *F16D 25/123* (2013.01); *F16D 48/02* (2013.01); *F16D 48/066* (2013.01); *F16D 2500/10425* (2013.01); *F16D 2500/70406* (2013.01); *F16D 2500/7045* (2013.01)
USPC ... 475/233; 475/238; 192/48.601; 192/85.61; 192/85.63

(58) Field of Classification Search
USPC ....................................................... 192/85.63
See application file for complete search history.

(56) References Cited

U.S. PATENT DOCUMENTS

| | | | |
|---|---|---|---|
| 2,730,914 A | 1/1956 | Rockwell | |
| 4,601,359 A | 7/1986 | Weismann et al. | |
| 4,630,704 A | 12/1986 | Yamakawa et al. | |

(Continued)

FOREIGN PATENT DOCUMENTS

| | | |
|---|---|---|
| DE | 4409224 A1 | 10/1994 |
| DE | 102005014654 | 10/2006 |

(Continued)

OTHER PUBLICATIONS

Japanese Office Action for related Japanese Patent Application No. 2008-190670 dated Jun. 6, 2012.

(Continued)

*Primary Examiner* — Troy Chambers
*Assistant Examiner* — Ryan Dodd
(74) *Attorney, Agent, or Firm* — Kenealy Vaidya LLP

(57) ABSTRACT

A hydraulic system for a vehicle clutch assembly can include an on-demand variable displacement pump and a purge valve for regulating hydraulic pressure supplied to the clutch(es). The hydraulic pressure at the pump can have multiple displacement settings to compensate for variable changes in clutch pressure requirements. The purge valve can be configured to purge hydraulic pressure from the hydraulic system so that an optimum, controllable, and/or pre-determined operating pressure can be supplied to the clutch(es). The system can be configured to provide accurate control of clutch(es) when a drivetrain is being automatically controlled to switch between a low gear ratio and a high gear ratio.

24 Claims, 9 Drawing Sheets

(56) References Cited

U.S. PATENT DOCUMENTS

| | | | |
|---|---|---|---|
| 4,768,609 A | 9/1988 | Taga et al. |
| 4,955,848 A | 9/1990 | Kotajima |
| 4,974,473 A | 12/1990 | Hatakeyama |
| 5,020,626 A | 6/1991 | Kodama |
| 5,054,335 A | 10/1991 | Andrews |
| 5,056,614 A | 10/1991 | Tokushima et al. |
| 5,058,700 A | 10/1991 | Shibahata |
| 5,119,900 A | 6/1992 | Watanabe et al. |
| 5,135,071 A | 8/1992 | Shibahata et al. |
| 5,141,072 A | 8/1992 | Shibahata |
| 5,353,889 A | 10/1994 | Hamada |
| 5,411,110 A | 5/1995 | Wilson et al. |
| 5,456,641 A | 10/1995 | Sawase |
| 5,669,850 A | 9/1997 | Dourra et al. |
| 5,728,022 A | 3/1998 | Schultz |
| 5,924,952 A | 7/1999 | Bowen |
| 5,989,146 A | 11/1999 | Brown et al. |
| 6,042,504 A | 3/2000 | Gualtieri et al. |
| 6,056,666 A | 5/2000 | Williams |
| 6,064,934 A | 5/2000 | Zhang |
| 6,086,515 A | 7/2000 | Buschmann et al. |
| 6,095,276 A | 8/2000 | Kuroda et al. |
| 6,105,703 A | 8/2000 | Kuroda et al. |
| 6,213,242 B1 | 4/2001 | Rodrigues et al. |
| 6,251,045 B1 | 6/2001 | Oliveira et al. |
| 6,257,082 B1 | 7/2001 | Ore |
| 6,549,840 B1 | 4/2003 | Mikami et al. |
| 6,579,208 B2 | 6/2003 | Oliveira et al. |
| 6,681,912 B2 | 1/2004 | Suzuki et al. |
| 6,697,725 B1 | 2/2004 | Williams |
| 6,699,151 B2 | 3/2004 | Grogg et al. |
| 6,725,989 B1 | 4/2004 | Krisher et al. |
| 6,814,682 B2 | 11/2004 | Spitale |
| 6,817,434 B1 | 11/2004 | Sweet |
| 6,848,555 B2 | 2/2005 | Sakata et al. |
| 6,942,592 B2 | 9/2005 | Haka |
| 6,948,604 B2 | 9/2005 | Puiu |
| 7,004,874 B2 | 2/2006 | Mizon et al. |
| 7,007,782 B2 | 3/2006 | Anwar et al. |
| 7,021,445 B2 | 4/2006 | Brissenden et al. |
| 7,059,460 B2 * | 6/2006 | Duan et al. ............... 192/70.12 |
| 7,062,984 B2 | 6/2006 | Haka |
| 7,086,987 B2 | 8/2006 | Janson et al. |
| 7,111,717 B2 | 9/2006 | Arai et al. |
| 7,136,735 B2 | 11/2006 | Carlson et al. |
| 7,217,209 B2 | 5/2007 | Saito et al. |
| 7,343,998 B2 | 3/2008 | Morin et al. |
| 7,349,776 B2 | 3/2008 | Spillane et al. |
| 7,442,148 B2 | 10/2008 | Eckle et al. |
| 7,455,134 B2 | 11/2008 | Severinsky et al. |
| 7,458,917 B2 | 12/2008 | Yoshikawa et al. |
| 7,549,497 B2 | 6/2009 | Homan et al. |
| 7,678,003 B2 | 3/2010 | Janson et al. |
| 2002/0036128 A1 | 3/2002 | Amanuma et al. |
| 2002/0155916 A1 | 10/2002 | Brown et al. |
| 2003/0211913 A1 | 11/2003 | Spitale |
| 2004/0029673 A1 | 2/2004 | Lipman |
| 2004/0099459 A1 | 5/2004 | Nakasako et al. |
| 2004/0159520 A1 | 8/2004 | Anwar et al. |
| 2005/0004732 A1 | 1/2005 | Berry et al. |
| 2005/0023102 A1 | 2/2005 | Brissenden et al. |
| 2005/0145460 A1 * | 7/2005 | Forsyth et al. ............. 192/103 F |
| 2006/0111823 A1 | 5/2006 | Tamai |
| 2007/0010927 A1 | 1/2007 | Rowley et al. |
| 2007/0016351 A1 | 1/2007 | Allen et al. |
| 2007/0049451 A1 | 3/2007 | Mizon et al. |
| 2007/0093347 A1 | 4/2007 | Janson et al. |
| 2007/0096557 A1 | 5/2007 | Tamai et al. |
| 2007/0219695 A1 | 9/2007 | Chiu et al. |
| 2007/0281823 A1 | 12/2007 | Hun |
| 2007/0299581 A1 | 12/2007 | Torralbo et al. |
| 2008/0046158 A1 | 2/2008 | Carey et al. |
| 2009/0032359 A1 * | 2/2009 | Asano ........................ 192/87.13 |
| 2009/0032360 A1 * | 2/2009 | Asano ........................ 192/87.13 |
| 2009/0099762 A1 | 4/2009 | Heinzmann et al. |

FOREIGN PATENT DOCUMENTS

| | | | |
|---|---|---|---|
| EP | 1236918 | * 12/2001 | ............. F16D 25/10 |
| EP | 1236918 | 9/2002 | |
| EP | 1371868 | 12/2003 | |
| JP | 59-219529 A | 12/1984 | |
| JP | 4-353027 A | 12/1992 | |
| JP | 9-310750 A | 12/1997 | |
| JP | 10-306775 A | 11/1998 | |
| JP | 11-247981 A | 9/1999 | |
| JP | 2000-142163 A | 5/2000 | |
| JP | 2001-113971 A | 4/2001 | |
| JP | 2004-19769 A | 1/2004 | |
| JP | 2006-214514 A | 8/2006 | |
| WO | 2005/064187 | 7/2005 | |
| WO | 2008/016537 A2 | 2/2008 | |

OTHER PUBLICATIONS

Japanese Office Action for related Japanese Patent Application No. 2008-190671 dated Jul. 4, 2012.

Search Report from European Patent App. No. 08155967.6 (Jul. 29, 2008).

Search Report from European Patent App. No. 08155876.9 (Jul. 25, 2008).

* cited by examiner

HYDRAULIC VEHICLE CLUTCH SYSTEM, DRIVETRAIN FOR A VEHICLE INCLUDING SAME, AND METHOD

CROSS REFERENCE TO RELATED APPLICATIONS

This application claims the priority benefit under 35 U.S.C. §120 and is a continuation-in-part of co-pending U.S. patent application Ser. No. 11/832,849 filed on Aug. 2, 2007, and also claims the priority benefit under 35 U.S.C. §120 and is a continuation-in-part of co-pending U.S. patent application Ser. No. 11/832,860 filed on Aug. 2, 2007, which are both hereby incorporated in their entirety by reference. This application also claims priority under 35 U.S.C. 119(e) to U.S. Provisional Application No. 61/301,884 filed on Feb. 5, 2010, the disclosure if which is also incorporated herein by reference.

BACKGROUND

1. Field

The presently disclosed subject matter relates to a vehicle drivetrain.

2. Description of the Related Art

Existing vehicle drive force transfer systems deliver a torque from the engine to the wheels of the vehicle through the transmission and other components of the vehicle drivetrain. In a torque transfer system for on-demand or user actuated four wheel drive modes for a vehicle, power from the engine and transmission may be selectively split between the front and rear wheels by incorporating a clutch mechanism in a rear wheel differential.

One example of a user controlled power transmitting device is described in U.S. Pat. No. 5,135,071 to Shibahata et al. Torque from a propeller shaft is transferred to a pair of rear wheel axles through a speed control device and a pair of left and right variable torque transmitting clutches. Each variable torque transmitting clutch is enclosed in a clutch case and contains multiple pairs of inner and outer friction plates or discs which are pressed together by a clutch actuating mechanism. When these pairs of discs are brought together, torque supplied by a common shaft is transferred to the drive axle of a wheel. The clutch actuating mechanism for these plates have sometimes included an electromagnetic actuator that controls a piston with presser members which are used to press the clutch mechanism's inner and outer plate pairs together. However, typically, a hydraulically controlled piston type actuating mechanism has been utilized, such as that described in U.S. Pat. No. 6,848,555 to Takatoshi Sakata et al.

The concept of providing and managing an on-demand type of torque transfer mechanism in which variable torque is provided in a four wheel drive system has also recently been implemented. Such a mechanism is known to provide excellent vehicle stability and control in all types of weather and road conditions. In addition, variable torque four wheel drive systems often minimize the drawbacks of conventional four-wheel drive systems in terms of weight, noise, performance and design capacity limits. U.S. Pat. No. 7,021,445 to Brissenden discloses an on-demand type of variable torque transfer mechanism for incorporation into a vehicle drive train. Unlike conventional on-demand four-wheel drive systems, which often react only to wheel slippage, the conventional variable torque management systems do not wait for wheel slip before beginning activation of semi or total four wheel drive mode. Instead, torque is proactively delivered to the rear wheels whenever the vehicle is accelerating for improved traction and control in both dry and slippery road conditions. When wheel slippage is detected, a variable torque management system can be configured to apportion additional torque to the rear in proportion to the amount of wheel slip. The system can continuously monitor the vehicle's dynamic condition via sensors in the engine, brake and throttle systems, and can adjust front-to-rear torque split for maximum control.

A central, computer-controlled, Power Control Unit (PCU) has been used to determine the right level of torque split (using sophisticated algorithms) for any given moment to provide optimal traction and stability. Torque can be delivered to the rear wheels via an electronic rear differential mechanism that employs a set of electrically controlled wet clutch packs to take up torque from the propeller shaft as the system demands.

Electric clutch actuation for on-demand type clutch mechanisms is currently a common mode of actuation for the on-demand clutch mechanism. Recently, hydraulic actuation of the clutch has also been attempted. However, there remains a need to advance hydraulic clutch actuation techniques, and to address recognized system limitations. For example, the size, weight, and electrical power consumption requirements along with cooling capacity of current hydraulic clutch mechanisms currently can result in bulky and expensive systems that are sometimes hampered by limited power characteristics, limited reaction time characteristics, limited cooling capacity, limited control, weight considerations, etc.

SUMMARY

According to one aspect of the disclosure, an apparatus for transferring torque from a vehicle drive train to a wheel of a vehicle can include a clutch having a driven part and a driving part. A hydraulic system can be provided and configured to actuate the clutch by placing the driven part into engagement with the driving part, the hydraulic system including operating structures that are configured to either act upon or be acted upon by a hydraulic fluid resulting in a change of pressure of the hydraulic fluid. The operating structures can include a piston configured to move the driven part into engagement with the driving part when an operating hydraulic fluid pressure is supplied to the piston, an on-demand variable displacement pump configured to supply the operating hydraulic fluid pressure to the first piston, and a purge valve located between and connected in fluid communication with the pump and the piston. The apparatus can include a controller configured to control at least one of the on-demand variable displacement pump and the purge valve to manipulate the operating hydraulic pressure to the piston.

According to another aspect of the disclosed subject matter, a rear differential assembly for distributing torque to at least one rear wheel of a vehicle can include an input member, first and second output members, and a clutch assembly configured to selectively couple the input member to at least one of the first and second output members. The clutch assembly can include first and second clutch driven parts, each connected to the input member, and first and second clutch driving parts selectively engageable with the first and second driven parts, respectively, and connected to the first and second output members, respectively. First and second pistons can be configured to displace the first and second driving parts, respectively, into engagement with the first and second driven parts, respectively. An on-demand variable displacement pump and a purge valve can be provided. The purge valve and one of the first and second pistons can be in fluid communication with the on-demand variable displacement pump. A controller can be provided and configured to operate at least one of the on-demand variable displacement pump and the purge valve to manipulate a fluid pressure supplied to the one of the first and second pistons.

According to another aspect of the disclosed subject, a drivetrain for a vehicle can include a multi-ratio transmission with a plurality of forward drive ratios and a reverse drive ratio. A two-speed final drive assembly can be connected in series with the multi-ratio transmission and can include a low speed final drive ratio and a high speed final drive ratio. A rear differential assembly can be driven by the two-speed final drive assembly and can include an input member, first and second output members, and a clutch assembly selectively coupling the input member to at least one of the first and second output members. The clutch assembly can include first and second clutch driven parts, each connected to the input member, and first and second clutch driving parts selectively engageable with the first and second driven parts, respectively, and connected to the first and second output members, respectively. First and second pistons can be configured to displace the first and second driving parts, respectively, into engagement with the first and second driven parts, respectively. An on-demand variable displacement pump and a purge valve can be provided. The purge valve and one of the first and second pistons can be in fluid communication with the on-demand variable displacement pump. A controller assembly can be configured to cause at least one of the on-demand variable displacement pump and the purge valve to manipulate a fluid pressure supplied to the one of the first and second pistons.

According to another aspect of the disclosed subject matter, a method for controlling torque distribution in a vehicle can include providing a multi-ratio transmission, a two-speed final drive assembly connected to the multi-ratio transmission, and a rear differential assembly connected to a power take-off assembly. The two-speed final drive assembly can include a low range drive ratio and a high range drive ratio. The rear differential can include an on-demand variable displacement pump having a low displacement setting and a high displacement setting, a piston, and a purge valve. The piston and the purge valve can be in fluid communication with the on-demand variable displacement pump. The method can include selecting one of the low range drive ratio and the high range drive ratio, engaging the selected one of the low range drive range ratio and the high range drive ratio, and operating at least one of the on-demand variable displacement pump and the purge valve to manipulate a fluid pressure supplied to the piston.

BRIEF DESCRIPTION OF THE DRAWINGS

The disclosed subject matter of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
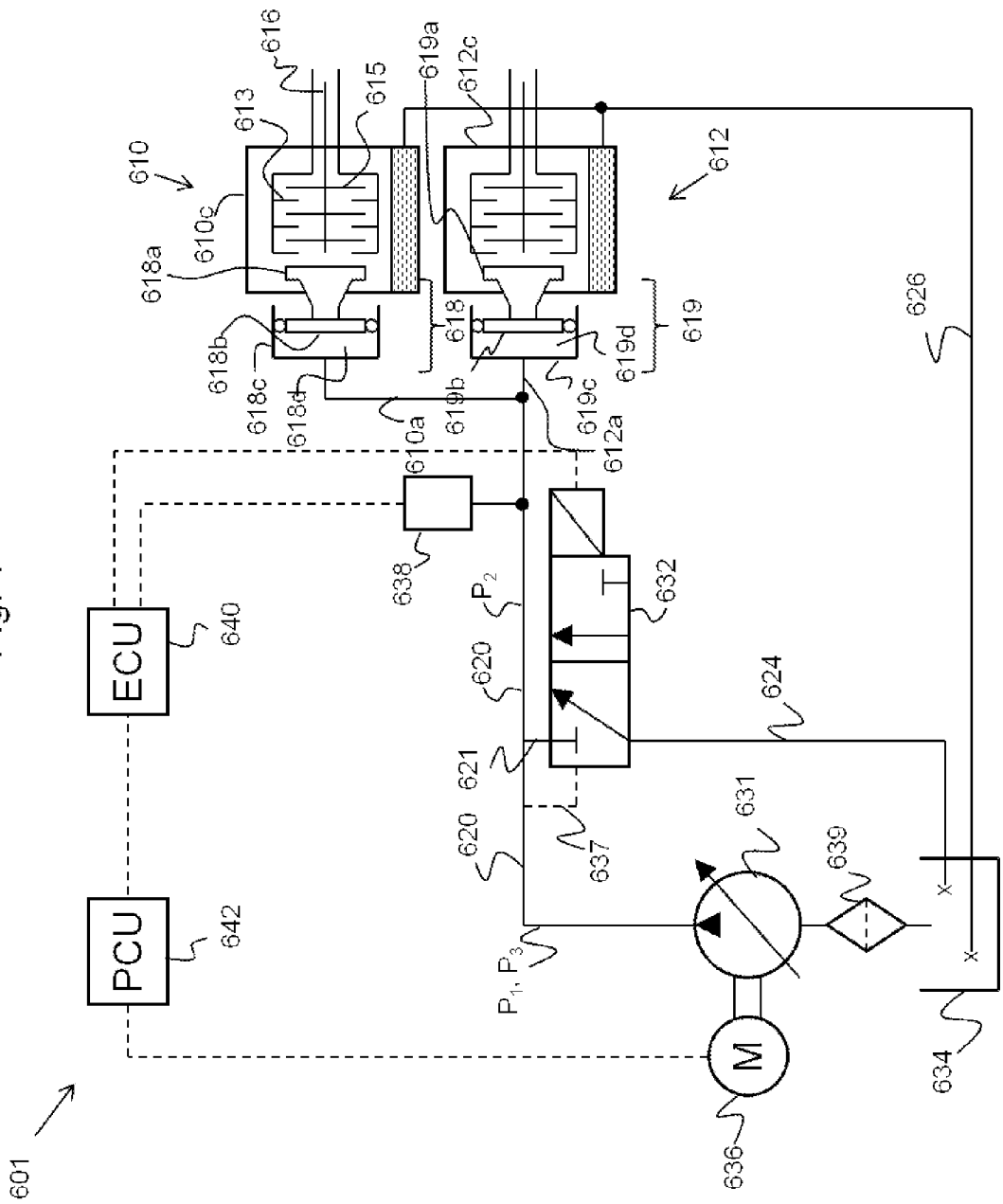
FIG. 1 is a schematic diagram of an embodiment of a hydraulic vehicle clutch system made in accordance with principles of the disclosed subject matter.

FIG. 1 depicts a schematic hydraulic circuit diagram for an embodiment of a hydraulic vehicle clutch system 601 made in accordance with principles of the disclosed subject matter. The system 601 can include an on-demand variable displacement pump 631 that can be connected to a pair of wet-type multi-disc friction clutches 610 and 612, respectively, via hydraulic fluid lines. A purge valve, such as solenoid valve 632, can be used to regulate the hydraulic pressure delivered to the clutches 610, 612. In one embodiment of the disclosure, the clutches 610, 612 may be a pair of variable torque transmitting clutches that are integrated into a vehicle's rear differential assembly, as will be described in more detail below with reference to FIGS. 7 and 8. When engaged, the clutches 610, 612 transfer torque from a propeller shaft to the rear wheels of the vehicle. See, for example, FIG. 7. The amount of torque transfer can be varied by varying the amount of fluid pressure that is delivered to each of the clutches 610, 612. Separate ones of the clutches 610, 612 can be located on opposite sides of the rear differential assembly, such as between a left wheel and the input to the rear differential assembly and between the right wheel and the input to the rear differential assembly, respectively. In another embodiment, at least one clutch set can be located in the drive shaft between the engine/power plant and the rear differential to provide drive to the rear wheels.

For purposes of the description of this embodiment, the description for the clutch 610 can apply equally to clutch 612. The clutch 610 can include a series of outer friction plates 613 (a driving part) and inner friction plates 615 (a driven part). A drive axle 616 for a vehicle wheel can be connected to the inner plates 615. The drive axle 616 can be configured as a rear axle (see, for example, FIGS. 7 and 8) or it can be configured as a front axle. Friction plates 613, 615 can be immersed in a lubricating fluid (e.g., hydraulic oil, etc.) located in a clutch case 610c. As will be described below with reference to FIGS. 7 and 8, outer friction plates 613 can be connected to a common shaft which can be coupled to, for example, a planetary gear system. In the alternative, the outer friction plates 613 can be configured to be driven by a propeller shaft and hypoid gear in combination. The hypoid gear can be similar in construction to a spiral bevel gear, but designed to connect non-parallel shafts that do not intersect (e.g., connecting the propeller shaft with the shaft of the outer friction plates 613). Thus, the outer friction plates 613 can be driven from an input from a prime mover (e.g., internal combustion engine, electric motor, etc.). For example, the prime mover can supply power to the outer friction plates 613 via a vehicle drivetrain which can include a rear differential assembly that is connected to a driveshaft and vehicle transmission. Of course, a front differential assembly can also be provided in the vehicle drivetrain to provide power to the front wheels of the vehicle.

An actuation device 618 can be used to actuate the clutch 610. As shown in FIG. 1, the actuation device 618 can include a presser member 618*a* connected to a hydraulic piston 618*b*. When the hydraulic piston 618*b* is displaced by hydraulic fluid, presser member 618*a* can press the outer plates 613 into engagement with the inner plates 615, thereby coupling the plates 613, 615 in torsion. Torque can then be transferred from the power unit and drivetrain via the clutch 610 to the drive axle 616. The actuation device 618 can include a cylinder 618*c* forming a chamber 618*d*. The hydraulic piston 618*b* can be displaced within the chamber 618*d* by hydraulic pressure introduced into the chamber 618*d*. Hydraulic pressure can be supplied to piston chamber 618*d* through first piston line 610*a*.

Hydraulic pressure can be delivered to the clutches 610, 612 via a pump line 620 that can be connected to first and second piston lines 610*a* and 612*a* which can be connected, respectively, to the first and second pistons/chambers 618*b*&*d*, 619*b*&*d*. The on-demand variable displacement pump 631 and motor 636 can be configured to act in combination with valve 632 to produce a standby pump pressure P1 and an active pump pressure P3 in the pump line 620. However, the production of the standby pump pressure P1 is not necessary. For example, the on-demand variable displacement pump 631 and motor 636 can simply circulate hydraulic fluid for cooling purposes, etc., when an active pump pressure P3 is not required by the system. In addition, the pump 631 and motor 636 can be powered off when not needed, and the system would not provide any pressurized fluid flow that would cool and/or lubricate the system. The purge valve, such as solenoid 632, can be configured to reduce the hydraulic pressure supplied to the first and second piston lines 610*a*, 612*a* by diverting a portion of the fluid delivered from the pump 631. For example, a valve input line 621 can connect the valve 632 to the supply line 620. A valve output line 624 then directs fluid to the reservoir 634 after passing through the valve 632. Thus, the valve 632 can be considered to be connected "in parallel" with the pump 631 and actuation device(s). A pilot line 637 can be provided with the valve 632 to provide a feedback passage to the valve 632. Moreover, valve 632 can be configured to act as a balance valve which balances the solenoid thrust force, generated upon receipt of a signal from ECU 640, with pressure from the feedback line 637. The valve input line 621 and pilot line 637 can be considered passage lines that allow the valve 632 to be connected in parallel with the pump 631 and the actuation device(s) 618, 619. Thus, the pump 631 can activate the actuation device(s) 618, 619 regardless of the position of the valve 632. The valve 632 can be used to control the pressure seen by the actuation device(s) 618, 619, but not to specifically turn on and off the actuation device(s) 618, 619.

A pressure sensor 638 can be used in the system to detect piston pressure P2, which is the pressure of the hydraulic fluid located downstream of the valve 632 and which is the pressure realized at the first and second pistons/chambers 618*b*&*d*, 619*b*&*d*. The on-demand variable displacement pump 631 can draw hydraulic fluid from a reservoir 634 which can receive the hydraulic fluid removed from the supply (pump) line 620 by the valve 632 and the hydraulic fluid returned from the clutch cases 610*c* and 612*c* via return line 626. A filter 639 can be placed between the reservoir 634 and the intake of the pump 631 to clean the hydraulic fluid before it is re-routed through the hydraulic circuit(s). In addition, if desired, a separate cooling/lubrication pump can be provided that is configured to separately feed oil or other cooling fluid to the clutch 610 and/or clutch 612.

On-demand variable displacement pump 631 can increase maximum hydraulic pressure capacity and retain clutch response time and efficiency at lower pressure demands. Specifically, on-demand variable displacement pump 631 can be set to at least a large displacement setting or a small displacement setting while also varying the speed at which the pump 631 is driven by the motor 636. This enhanced versatility can provide a greater range of on-demand hydraulic pressure provided by the pump 631. Specifically, the pump 631 can provide a first range of output flow rates and corresponding output pressures based on the large displacement setting by varying the output speed of the motor 636 between a minimum speed and a maximum (i.e., full) speed. The pump 631 can also provide a second range of output flow rates and corresponding output pressures based on the small displacement setting by varying the output speed of the motor 636. As a result, the large displacement setting of the pump 631 can provide an overall maximum output flow rate at the maximum output speed of the motor 636. The small displacement setting of the pump 631 can also provide an overall maximum output pressure at the maximum output speed of the motor 636. Thus, pump 631 can increase maximum hydraulic pressure capacity of the clutch system 601 and can increase clutch response time and efficiency at lower pressure demands while avoiding an enhancement requirement to the performance specifications of the motor 636.

Because the on-demand variable displacement pump 631 can output a greater displacement at lower pressure demands, faster travel of the hydraulic piston(s) 618*b* and 619*b* can be realized. This can then provide a faster reaction time for actuation of the clutch(es) 618, 619. When higher hydraulic pressures are required, displacement of on-demand variable displacement pump 631 can be reduced in order to facilitate the increase in pressure of the hydraulic system without a corresponding increase in the output torque specification of motor 636. Thus, a motor 636 having a minimized size and/or weight can be specified for the clutch system 601 while simultaneously maximizing the performance capacity of the clutch system 601.

As noted above, the hydraulic components of the clutch system 601 can be integrated into a rear casing of a vehicle that includes clutches 610, 612 and other components of a rear differential assembly. See, for example, FIG. 8. The relatively few component parts that may be used for the hydraulic actuator according to this disclosure can reduce the complexity, weight and packaging requirements of a clutch actuator, without losing an ability to retain precise, on-demand control over the clutches 610, 612 during a variety of driving conditions. Additionally, it has been found that the hydraulic actuator system can affect a transfer of high torque loads over a short duration through the clutches without the need for cams or additional friction plates in the clutch. In one embodiment, the hydraulic actuator system can be configured for producing a maximum operating pressure of 1 MPa for clutches 610 and 612 (and pistons 618 & 619). However, pump design can be reconfigured to easily permit an operating pressure of 3 MPa or more. It should be understood that an electro-magnetic (EM) clutch operates at a force that is less than a force that a hydraulic clutch is able to produce, for example 300-350 kgf as compared to 1000 kgf or more, for a given packaging size and weight.

The dashed lines in FIG. 1 indicate the control lines for the various hydraulic components. For example, the valve 632 can be controlled by an electronic control unit (ECU) 640, which signals when clutches 610, 612 should be actuated to provide additional or different drive force to the vehicle's wheel(s). A pump motor 636 can be controlled by a pump control unit (PCU) 642 which is controlled by commands sent from the ECU 640. ECU 640 and/or PCU 642 can select an output pressure and output displacement for the on-demand variable displacement pump 631 that lies between the maximum and minimum values, inclusive. ECU 640 and/or PCU 642 can then signal the pump 631 to operate at the selected pressure and displacement. It will be understood that although FIG. 1 illustrates ECU 640 and PCU 642 as separate from each other, these controllers may be integrated into a single ECU. Further, the PCU 642 can be located at the same or a different location from the hydraulic actuator. The motor 636 can be a brushless DC motor, and the valve 632 can be a two position, two-way linear solenoid valve, for example. The valve 632 may be operated in a fully open position, fully closed position, or at intermediate positions as directed by the ECU 640 to provide a great deal of control with regard to the amount of torque that is transmitted by the clutches 610, 612. Moreover, the valve position can depend on a combination of the hydraulic pressure and the command signal provided by the ECU 640.

Figure 2:
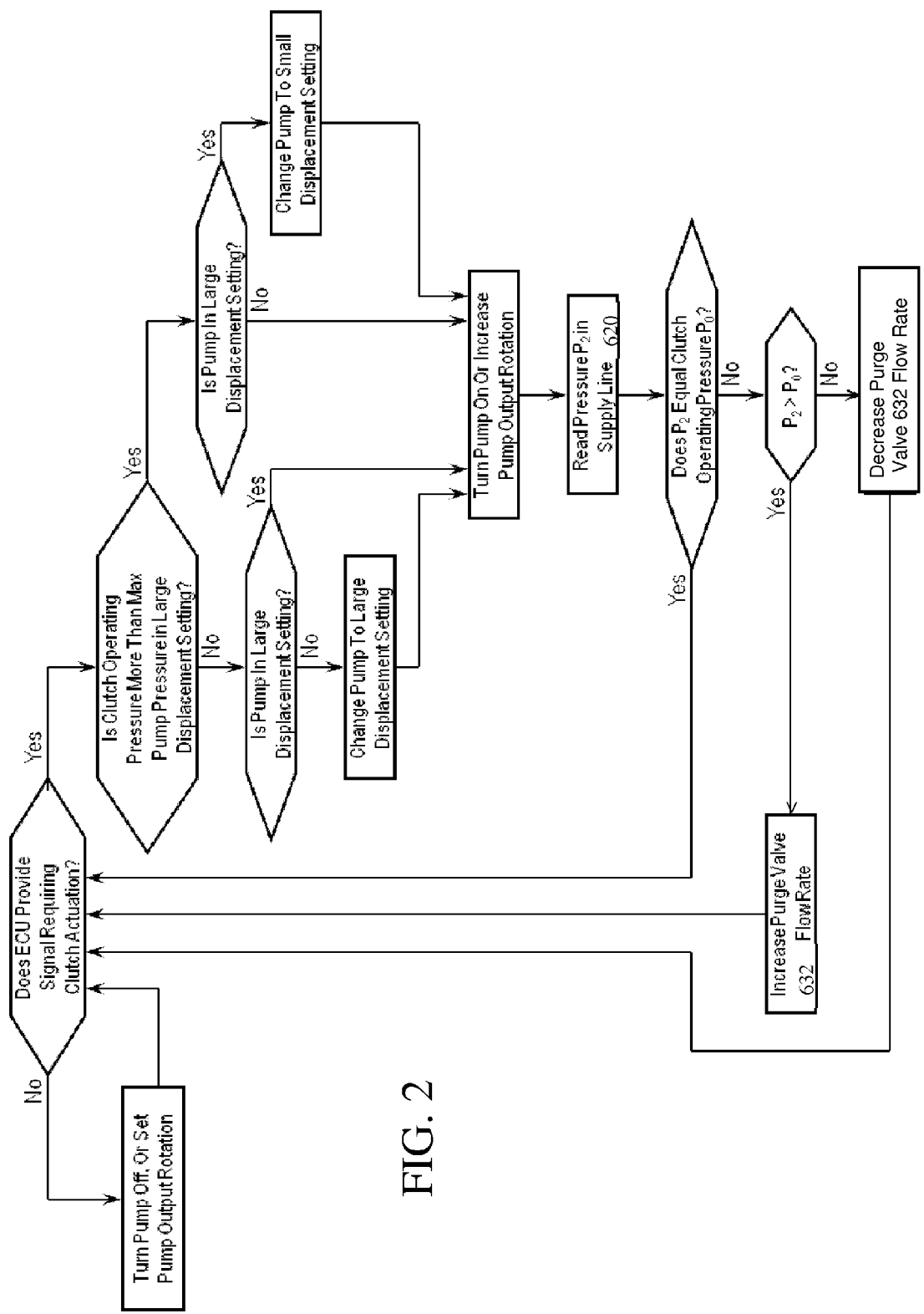
FIG. 2 is a flow diagram illustrating a process flow for the hydraulic vehicle clutch system of FIG. 1.

FIG. 2 is a flow diagram illustrating a process flow for the hydraulic vehicle clutch system of FIG. 1 in which the ECU 640 can be used to provide control over the entire hydraulic system 601. If the ECU 640 determines that the clutch or clutches 610, 612 do not need to be activated (no additional or different drive source for the vehicle is required), then the ECU 640 can send a signal to the PCU 642 to maintain the output pump rotation at a preset level (which can be zero). An associated standby pressure thus can be output from the on-demand variable displacement pump 631, which can be zero if the preset rotation of the pump 631 is zero. As described previously, the displacement of pump 631 can be manipulated between at least a large displacement setting and a small displacement setting, which provides a higher range of pressure output capabilities produced by pump 631 without a corresponding increase in the specified output torque of pump motor 636. When the ECU 640 determines that the clutch or clutches 610, 612 are to be actuated, the ECU 640 can then determine if the clutch operating pressure is greater than the maximum pressure available from pump 631 when the pump 631 is set at the large displacement setting.

If the ECU 640 determines that the clutch 610, 612 operating pressure is greater than the maximum pressure available from the on-demand variable displacement pump 631 when the pump 631 is set to the large displacement setting, the ECU 640 then can determine the present displacement setting of the on-demand variable displacement pump 631 (large or small). A signal can then be sent from the ECU 640 to the PCU 642 to change the displacement setting to small, if it is not already operating at that displacement level.

If the ECU 640 determines that the clutch operating pressure is less than the maximum pressure for the large displacement setting, the ECU 640 can then send a signal to the PCU 642 to change the on-demand variable displacement pump 631 displacement setting to large, if it is not already operating at this displacement setting.

Once the appropriate on-demand variable displacement pump 631 displacement setting has been selected and set, the ECU 640 can determine if the clutch or clutches 610, 612 are to be actuated and a signal can then be sent to the PCU 642 from the ECU 640 to increase the pump 631 output flow (via an increase in output speed of the motor 636) to achieve pressure P3 which has higher potential pressure than the operating pressure needed for clutches 610, 612 to output the particular/desired torque transmission. The ECU 640 can then read the pressure P2 detected at the downstream piston line 620 by the pressure sensor 638. Depending on the pressure reading received from the pressure sensor 638, the ECU 640 can then send a signal to the valve 632 to change the purge rate from either fully closed (no purge) to fully open (full purge) or possibly somewhere in between (partial purge). If the pressure P2 in the piston line 620 is equal to the desired operating pressure Po of the clutch 610 and/or clutch 612, the flow rate through the valve 632 can be maintained. If the pressure P2 begins to exceed the operating pressure Po, the flow rate through the valve 632 can be increased, thereby reducing the pressure P2 and maintaining it at Po. Conversely, if the pressure P2 begins to drop below the operating pressure Po, the flow rate through the valve 632 can be decreased to maintain the operating pressure at Po. Moreover, the ECU 640 can control pressure P2 (and not flow, per se) by controlling valve 632, which can be configured as a linear pressure control valve (e.g., not a flow control valve).

The operating method illustrated in the flow diagram shown in FIG. 2, can facilitate the use of an on-demand four wheel drive system in a vehicle where the drive train includes a high and low range gear. Specifically, during high range gear operation the on-demand variable displacement pump 631 can be set at a large displacement setting in order to facilitate fast response times at lower torque levels of desired clutches. Alternatively, the on-demand variable displacement pump 631 can be set at a small displacement setting in order to facilitate higher torque levels of desired clutches. Therefore, with use of the on-demand variable displacement pump 631 the hydraulic clutch system can sense the operating pressure of the clutches 610, 612 and automatically adjust the hydraulic pressure supplied to the clutches 610, 612 via manipulation of the on-demand variable displacement pump 631 (between at least a small and large displacement setting) and control valve 632. Further details of this operation will be described below with reference to FIGS. 7-10.

It should be noted that the hydraulic system 601 of FIG. 1 can be devoid of an accumulator, which is typically used for storing hydraulic pressure needed to activate clutches 610, 612. Instead, when the ECU 640 determines that the clutches need to be actuated, a control signal can be sent to motor 636 to increase the output pump pressure P3 (via an increase in output speed of the motor 36) to a value that may be greater than the desired operating pressure for clutches 610, 612. The output pressure P3 can be further adjusted depending on the torque loading requirements while the clutches 610, 612 are actuated. It should also be mentioned that clutch system 601 can include only two hydraulic components that regulate hydraulic pressure that is seen at the piston: the on-demand variable displacement pump 631 and the valve 632. Thus, a greatly simplified hydraulic actuator design, providing weight savings and reduced packaging size for the clutch system 601 is possible. The clutch system 601 can be configured to be primarily static in nature, such that P1=P2=P3 when balance is achieved.

Figure 3:
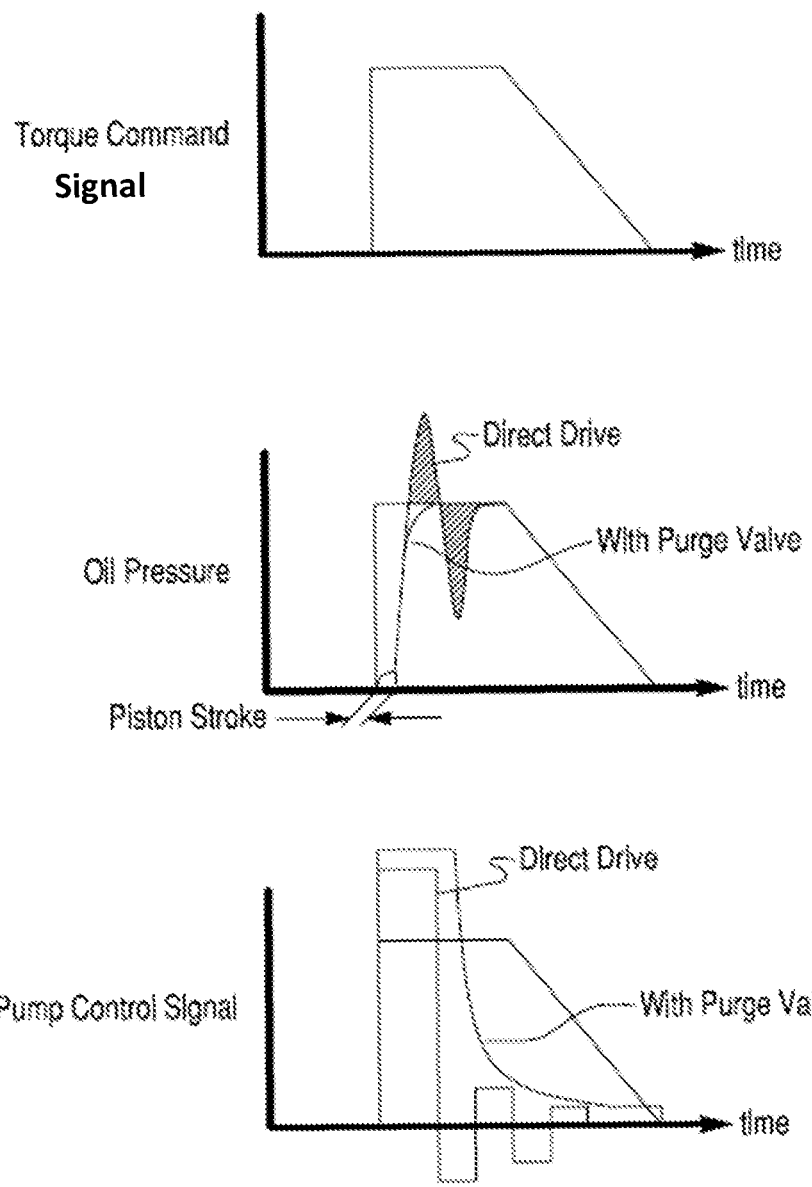
FIG. 3 is a set of comparative charts showing torque command signal, oil pressure, and pump control signal with respect to time for a direct drive system and for a purge valve system made in accordance with principles of the disclosed subject matter.

FIG. 3 is a set of comparative charts showing torque command signal, oil pressure, and pump control signal with respect to time for a direct drive system and for a purge valve system made in accordance with principles of the disclosed subject matter. The lines representing the direct drive system are shown for comparison purposes and correspond to a system in which a pump is connected directly to a piston/clutch mechanism with no purge valve located therebetween. In such a case, as shown in the Oil Pressure chart, when the pump receives a signal from the ECU to increase the pressure of hydraulic fluid in the hydraulic circuit, precise control of the pressure may be difficult. Initially, the pressure typically shoots past the desired operating pressure, then is over controlled/reduced to a pressure well below the desired operating pressure, and undergoes several correcting actions/fluctuations before stabilizing at the desired operating pressure. By contrast, when a purge valve is used in this circuit, as shown in the Oil Pressure chart, the hydraulic pressure takes slightly longer to initially arrive at desired operating pressure, but very little fluctuation of pressure occurs after the initial arrival, and highly accurate control can thus be achieved. It is believed that this greater control can be achieved because the purge valve controls the initial energy/pressure burst produced by the pump and removes the large fluctuation of pressure that would otherwise be initially present in the hydraulic circuit.

Use of a hydraulic circuit vehicle clutch system that consists only of an oil pump and a clutch provides a simple and light weight system. However, as can be seen in FIG. 3, control precision is lacking (even when a motor control system is precisely controlled). The use of a purge valve in the system provides the desired control precision while not adding significant weight, size or cost. When used with a system that includes right and left torque distribution (e.g., the system shown in FIG. 1), the use of the system with a purge valve provides even greater weight size and cost reduction characteristics. Additionally, due to the ability to increase the clutch thrust, the presently disclosed subject matter also makes it possible to decrease not only the weight of the system but also the size (and weight) of the clutch structure itself.

Figure 4:
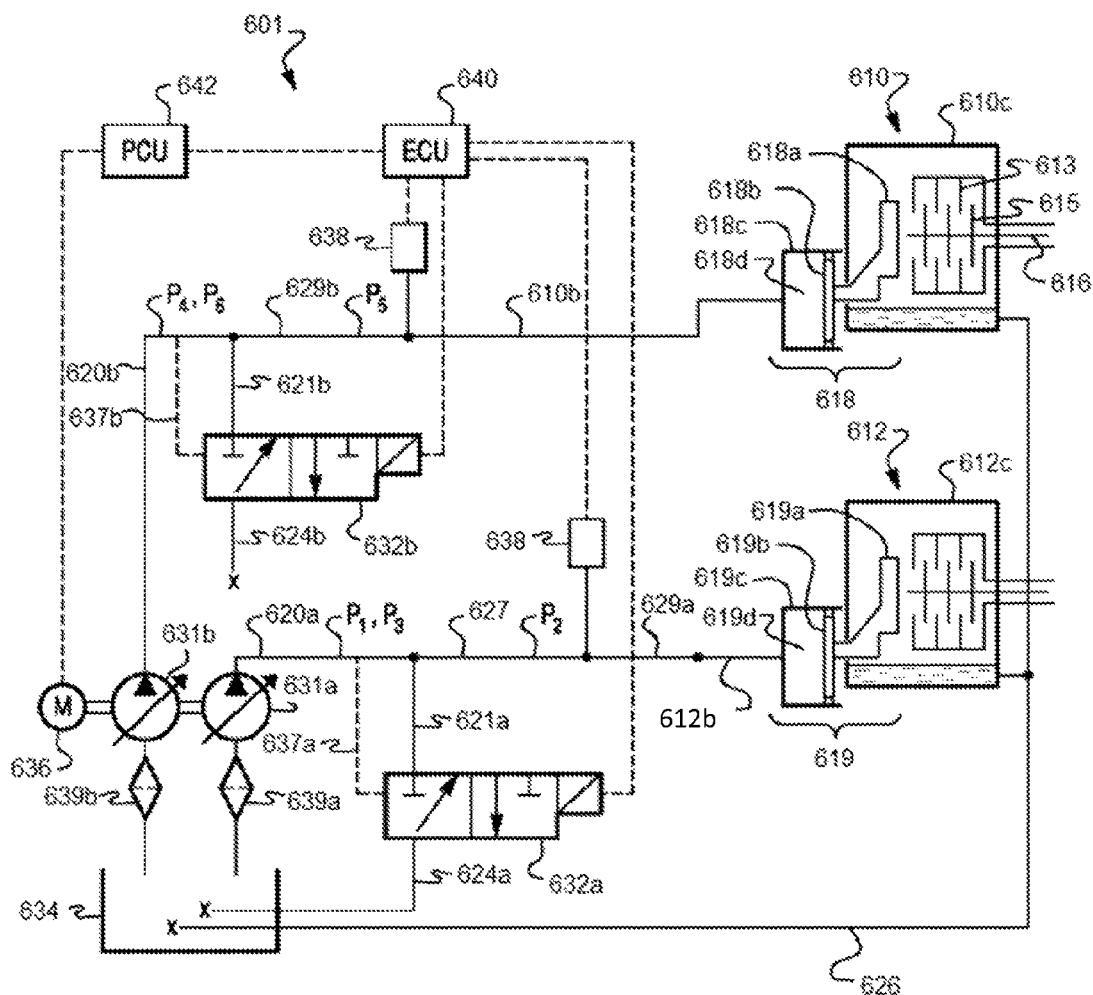
FIG. 4 is a schematic diagram of another embodiment of a hydraulic vehicle clutch system made in accordance with principles of the disclosed subject matter.

FIG. 4 is a schematic diagram of another embodiment of a hydraulic vehicle clutch system 601 in which two on-demand variable displacement pumps 631a and 631b are provided to circulate hydraulic fluid within two separately and independently controllable hydraulic circuits 629a and 629b. The separate circuits 629a and 629b allow independent and selective control of each of the clutches 610 and 612 such that two separate drive wheels of a vehicle can be independently and selectively driven. Thus, vehicle stability control and highly accurate drive slippage control can be accomplished using the system shown in FIG. 4. For example, if the system is installed in a rear differential for a vehicle and the vehicle is cornering, additional torque can be applied to an appropriately selected (typically outside) drive wheel to provide greater steerage. Determination of amount and application of torque can be made by the ECU 640 and/or PCU 642 based on several factors, including acceleration amount, steering angle, braking amount, suspension location, interaxle speed difference, drive torque, vehicle speed, yaw moment, etc.

The first circuit 629a can include a first on-demand variable displacement pump 631a that is connected to a first purge valve, such as a solenoid valve 632a, by a first pump line 620a. The first valve 632a can be connected to the first clutch 612 by a second piston line 612b. A pressure sensor 638 can be located at a position along the second piston line portions 627 and 612b to monitor and report the pressure P2 thereof to the ECU 640. When the ECU 640 determines that actuation of clutch 612 is desired, the ECU 640 can send a signal to the motor 636 via the PCU 642 to cause the motor 636 to increase pump output from first pump 631a. The increased pump output can cause pressure in the first pump line 620a to increase from a standby pressure P1 (or no pressure) to an active pressure P3. The active pressure P3 can be greater than the desired operating pressure for the clutch 612. The ECU 640 then can control the first valve 632a to divert hydraulic fluid from the first pump line 620a such that pressure in the first piston line portions 627, 612b is maintained at P2, which is substantially equal to the desired operating pressure for the clutch 612. Control of the valve 632a can be dynamic in nature such that the pressure P2 seen at the piston 619b rises quickly and arrives at the clutch/piston operating pressure smoothly and with little overshoot or fluctuation, regardless of the higher flow or pressure being output by the first pump 631a. The purge valve 632a can include a valve line input 621a and valve line output 624a. If desired, a pilot line 637a can be provided with the valve 632a to provide a feedback passage to the valve 632a. While immediately after actuation, the system is dynamic in nature, the system can be configured to be primarily static in nature, such that P1=P2=P3 when balance is achieved.

Alternatively, control of pressure P2 can be accomplished solely through control of valve 632a if the output pressure produced by first pump 631a is maintained at a high enough pressure to provide the entire range of possible desired operating pressures for the clutch 612. In such a set up, there is no need for the pump to provide a standby pressure P1—the pump would only output an active pressure P3 that is higher than any possible desired operating pressure for the clutch 612. While such a system may be more responsive and easier to control, certain energy loss and component wear characteristics may not be desirable. Thus, the ECU 640 can be programmed to control one or both of the motor 636 and first valve 632a depending on various operating parameters, user choice, etc.

The second circuit 629b can include a second on-demand variable displacement pump 631b that is connected to a second purge valve 632b by a second pump line 620b. The second valve 632b can be connected to the second clutch 610 by a second piston line 610b. A pressure sensor 638 can be located at a position along the second piston line 610b to monitor and report the pressure P5 thereof to the ECU 640. When the ECU 640 determines that actuation of clutch 610 is desired, the ECU 640 can send a signal to the motor 636 via the PCU 642 to cause the motor 636 to increase pump output from second pump 631b. The increased pump output can cause pressure in the second pump line 620b to increase from a standby pressure P4 (or no pressure) to an active pressure P6. The active pressure P6 can be greater than the desired operating pressure for the second clutch 610. The ECU 640 can then control the second valve 632b to divert hydraulic fluid from the second pump line 620b such that pressure in the piston line 610b is maintained at P5, which is substantially equal to the desired operating pressure for the clutch 610. Control of the valve 632b can be dynamic in nature such that the pressure P5 seen at the piston 618b rises quickly and arrives at the clutch/piston operating pressure smoothly and with little overshoot or fluctuation, regardless of the higher pressure being output by the second pump 631b. The purge valve 632b can include a valve line input 621b and valve line output 624b. If desired, a pilot line 637b can be provided with the valve 632b to provide a feedback passage to the valve 632b.

Similar to the first circuit 629a, the second circuit 629b can achieve control of pressure P5 solely through controlling valve 632b if the output pressure produced by first on-demand variable displacement pump 631a is maintained at a high enough pressure to provide the entire range of possible desired operating pressures for the second clutch 610. In addition, filters 639a and 639b can be used to filter hydraulic fluid prior to admission to the on-demand variable displacement pumps 631a and 631b.

Because the first clutch 612 and the second clutch 610 are operated through the use of separate hydraulic circuits 629a and 629b, respectively, each of the clutches can be separately and independently controlled with respect to each other. If the drive axles 616 are connected to rear wheels of a vehicle, the separate and independent control allows a user to control lateral torque distribution in the vehicle, as well as provide steering assistance, drive stabilizing functions, direct yaw control, etc. Of course, these features could also be realized if other combinations of vehicle wheels are powered by the clutches 610 and 612. Operation of the clutch system 601 of FIG. 4 can be in accordance with the process flow of FIG. 2.

Figure 5:
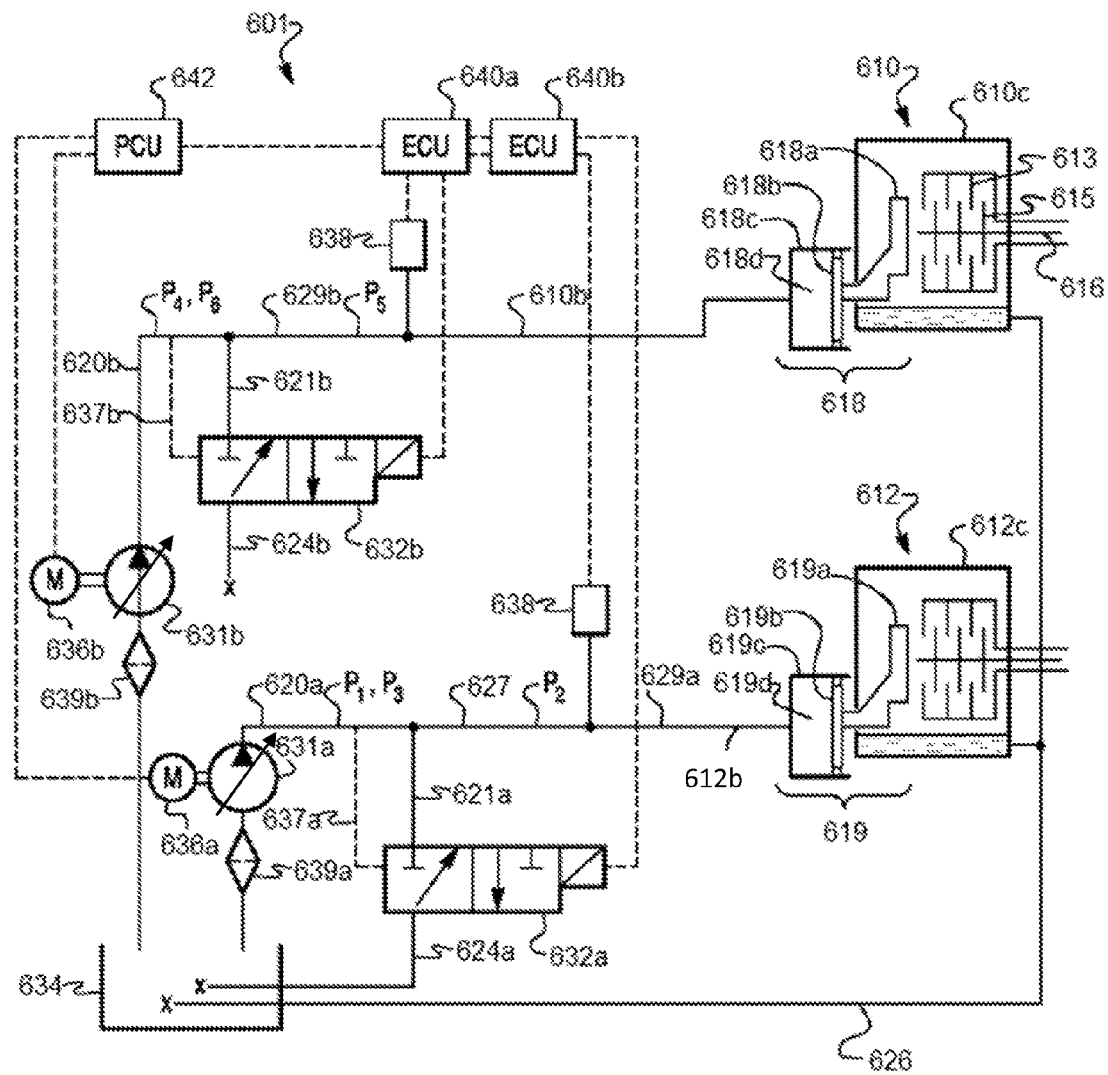
FIG. 5 is a schematic diagram of another embodiment of a hydraulic vehicle clutch system made in accordance with principles of the disclosed subject matter.

As shown in FIG. 5, another embodiment of a hydraulic clutch system 601 can include a multi-circuit device which includes two separate motors 636a and 636b that can be controlled either together or separately to provide power to on-demand variable displacement pumps 631a and 631b, respectively, of each circuit. Thus, an entire circuit can be de-activated if desired. Two ECU's 640a and 640b can also be provided to separately control each of the hydraulic circuits 629a and 629b and to provide redundancy backup in case one ECU malfunctions and must be de-activated. Moreover, the motor 636a and pump 631a can both be actuated at different times and at different speeds with respect to the motor 636b and pump 631b to selectively provide different operating characteristics to either of the circuits. Operation of the clutch system 601 of FIG. 5 can be in accordance with the process flow of FIG. 2.

Figure 6:
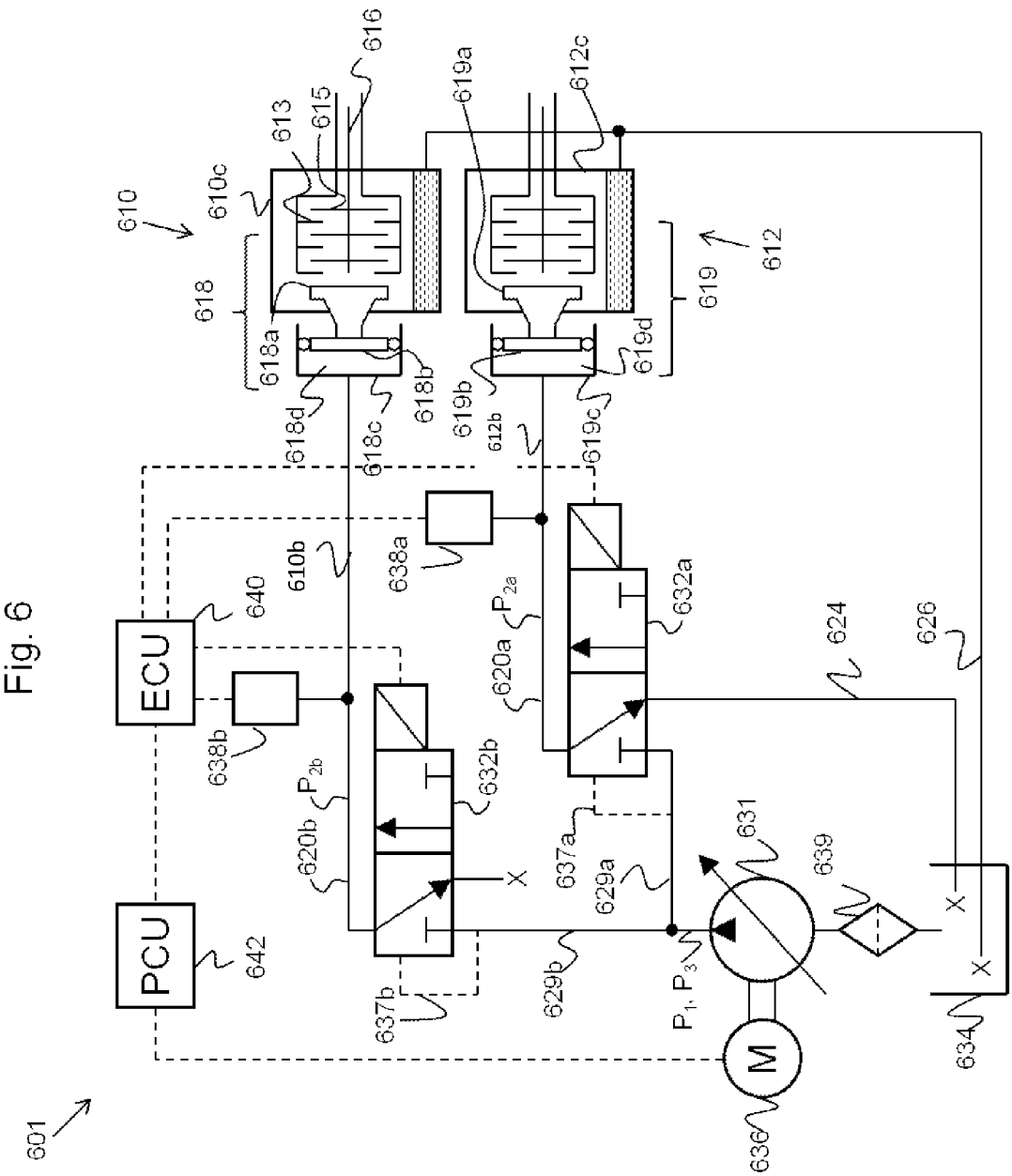
FIG. 6 is a schematic diagram of another embodiment of a hydraulic vehicle clutch system made in accordance with principles of the disclosed subject matter.

FIG. 6 is a schematic diagram of another embodiment of a hydraulic vehicle clutch system in which a single on-demand variable displacement pump 631 and motor 636 can be configured to act in combination with valves 632a, 632b to produce standby pump pressure P1 and an active pump pressure P3 in the pump lines 620a, 620b. The on-demand variable displacement pump 631 can be manipulated to vary its speed based on the hydraulic pressure demands of the clutches 610, 612.

The use of two separate control valves 632a and 632b can be used to control the individual output pressure to clutches 610 and 612. These control valves can be, for example linear solenoid-type valves. The separate circuits 629a and 629b allow independent and selective control of each of the clutches 610 and 612 such that two separate drive wheels of a vehicle can be independently and selectively driven. Thus, vehicle stability control and highly accurate drive slippage control can be accomplished using the system shown in FIG. 6. Determination of the amount and application of torque can be made by the ECU 640 and/or PCU 642 based on several factors, including acceleration amount, steering angle, braking amount, suspension location, interaxle speed difference, drive torque, vehicle speed, yaw moment, etc.

When the ECU 640 determines that actuation of clutches 610 and/or 612 is desired, the ECU 640 can send a signal to the motor 636 via the PCU 642 to cause the motor 636 to increase the output of on-demand variable displacement pump 631. The increased pump output causes pressure in the first pump line 620a to increase from a standby pressure P1 (or no pressure) to an active pressure P3. The active pressure P3 can be equal to or greater than the desired operating pressure for either clutch 610 or 612. The ECU 640 then controls the control valves 632a and 632b to control the output pressure to the individual clutches 610, 612, ranging from 0 to the maximum pressure generated by the on-demand variable displacement pump 631. This configuration can provide independent control of each of the clutches 610, 612 while using a single common on-demand variable displacement pump 631. Control of the control valves 632a and 632b can be dynamic in nature such that the pressures P2a and P2b seen at the pistons 618b and 619b, respectively, rises quickly and arrives at the clutch/piston operating pressure smoothly and with little overshoot or fluctuation, regardless of the higher flow or pressure being output by the on-demand variable displacement pump 631. Operation of the clutch system 601 of FIG. 6 can be in accordance with the process flow of FIG. 2. Pressure sensors 638a and 638b can be used in the system to detect the piston pressures P2a, P2b which in turn can aid the ECU 640 in determining appropriate operating parameters.

Figure 7:
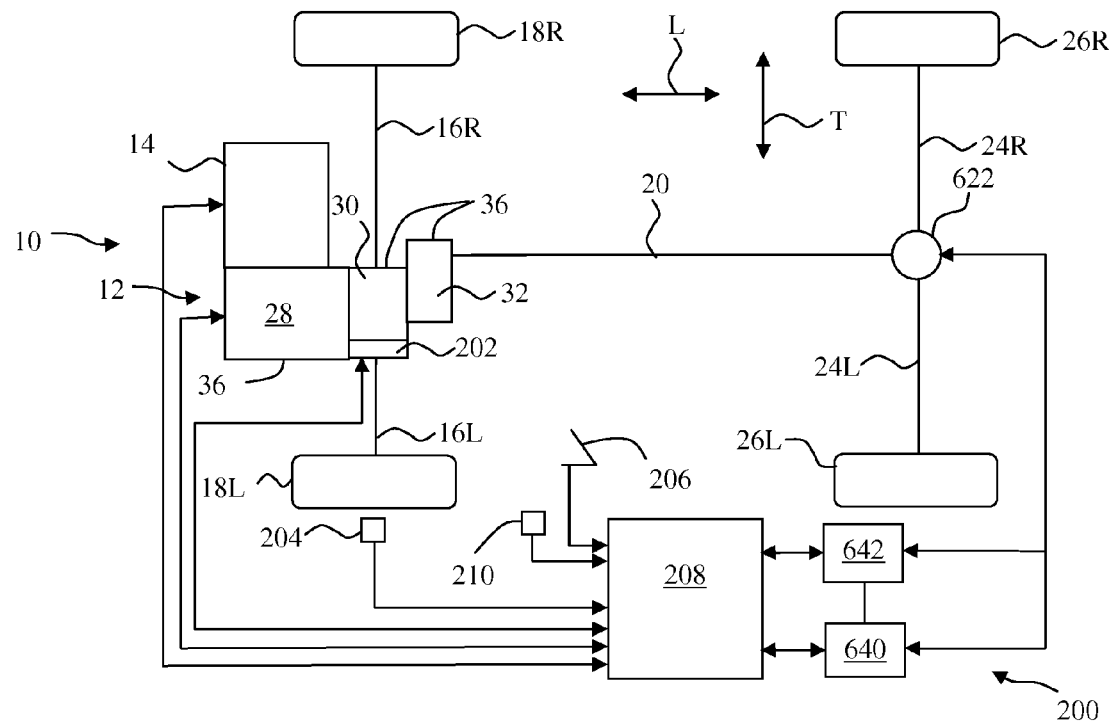
FIG. 7 is schematic diagram illustrating an embodiment of a vehicle drivetrain made in accordance with principles of the disclosed subject matter.

A vehicle hydraulic clutch system 601 in accordance with the disclosed subject matter can be utilized in a vehicle configured as a two-wheel drive vehicle (e.g., front-wheel drive or rear-wheel drive), a four-wheel drive vehicle, an all-wheel drive vehicle, or a two-wheel drive vehicle with on-demand all-wheel drive. FIG. 7 schematically represents a vehicle 10 that is configured as a front-wheel drive vehicle with on-demand all-wheel drive. The powertrain of the vehicle 10 can include a power source 14 and a drivetrain. The power source 14 can be an internal combustion engine, an electric motor, or hybrid power source, as is known in the art. The drivetrain can be connected to and driven by the power source 14 in a manner that is known in the art. The drivetrain can include a transaxle 12, a rear differential assembly 622, and a control system 200. The rear differential assembly 622 of FIG. 7 can include a hydraulic vehicle clutch system 601 made in accordance with principles of the disclosed subject matter, as will be described below with reference to FIG. 8.

The transaxle 12 can include a multi-ratio transmission 28, a two-speed final drive assembly 30 and a power take-off assembly 32. The multi-ratio transmission 28 can include a discrete number of forward drive ratios and a reverse drive ratio, which can be selected manually by an operator of the vehicle 10 or automatically, as is known in the art. U.S. Pat. No. 4,974,473, the entirety of which is incorporated herein by reference, discloses an example of a conventional automatic transmission that has a plurality of discrete forward drive ratios and a reverse drive ratio.

Alternatively, the multi-ratio transmission 28 can include a plurality of forward drive ratios that can be varied continuously within the multi-ratio transmission 28 between a minimum drive ratio and a maximum drive ratio. The continuously variable multi-ratio transmission can also include a reverse drive ratio. U.S. Pat. No. 7,217,209, the entirety of which is incorporated herein by reference, discloses an example of a continuously variable multi-ratio transmission.

The two-speed final drive assembly 30 can be driven by the multi-ratio transmission 28 and can drive each of the front driveshafts 16L, 16R and the power take-off assembly 32 based on a selected one of a high range drive ratio and a low range drive ratio. Each of the high range drive ratio and the low range drive ratio can be selected independent of the ratio selected in the multi-ratio transmission 28. That is, the two-speed drive assembly 30 can provide the selected one of the high range drive ratio and the low range drive ratio in series with any one of the reverse ratio and the forward ratios selected in the multi-ratio transmission 28. The two-speed drive assembly 30 can include a high range gearing assembly that corresponds to the high range drive ratio and a low range gearing assembly that corresponds to the low range drive ratio. The high range gearing assembly can be used for normal driving conditions, such as driving on a level surface, driving at highway speeds, driving on a dry road, etc. The low range gearing assembly can be used for special driving conditions, such as driving on low traction surfaces, off-road driving, towing a trailer on an inclined surface at low speeds, starting from a stop with a trailer attached to the vehicle 10, etc. Selection of the high range gearing and the low range gearing can be performed automatically by the control system 200, as will be discussed in detail below.

Co-pending U.S. patent application Ser. No. 12/847,639, entitled "Transversely Mounted Transaxle Having A Low Range Gear Assembly and Powertrain for A Vehicle Including Same," filed concurrently herewith, and incorporated in its entirety herein by reference, discloses further details of an exemplary embodiment of the transaxle 12.

Each of the low range gearing assembly and the high range gearing assembly can be provided by respective combinations of meshing gears, such as those disclosed in the above-referenced co-pending U.S. patent application Ser. No. 12/847,639. However, other known combinations of meshing gears can be used to provide a respective one of the low range gearing and the high range gearing.

The power-take-off assembly 32 can be permanently coupled to the two-speed final drive assembly 30 in a manner known in the art. In this configuration, the vehicle 10 can be configured as an all-wheel-drive vehicle and the rear differential assembly 622 can be driven at all times by the two-speed final drive assembly 30.

Alternatively, the power-take-off assembly 32 can be selectively coupled to the two-speed drive assembly 30 by a clutch in any manner known in the art. Thus, the vehicle 10 can be converted between a front-wheel-drive vehicle and an all-wheel-drive vehicle, if desired.

The vehicle 10 can be selectively configured as a front-wheel-drive vehicle when the power-take-off assembly 32 is not coupled to the two-speed drive assembly 30. In this case, the rear differential assembly 622 is not driven by the two-speed final drive assembly 30.

The vehicle 10 can also be selectively configured as an all-wheel-drive vehicle when the power-take-off assembly 32 is connected to the two-speed final drive assembly 30. In this case, the rear differential assembly 622 can be driven by the two-speed final drive assembly 30.

The control system 200 of FIG. 7 can select the appropriate one of the low range drive ratio and the high range drive ratio without direct input from the driver of the vehicle. That is, the control system 200 can cause a shift between the low range drive ratio and the high range drive ratio without the driver of the vehicle moving a gear shift lever or pushing an electrical switch mounted in the driver area of the passenger compartment.

Figure 8:
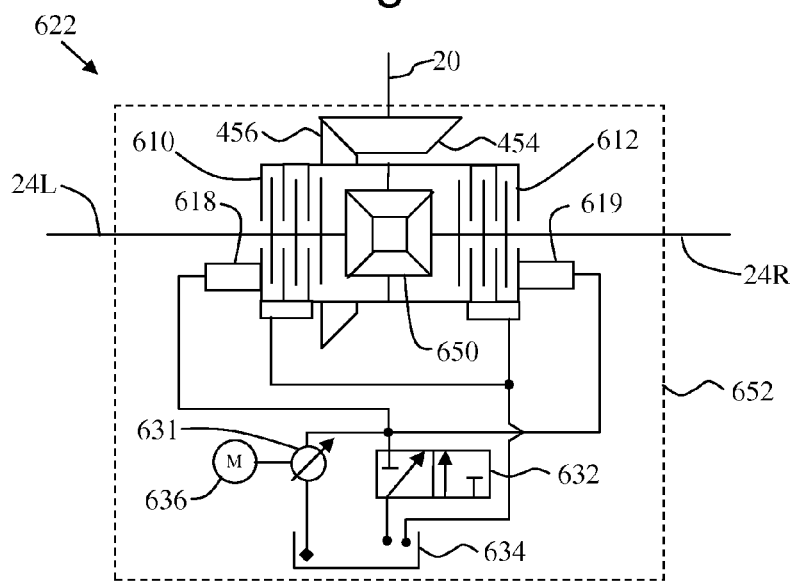
FIG. 8 is a schematic diagram of the rear differential assembly of FIG. 7 including a hydraulic vehicle clutch system made in accordance with principles of the disclosed subject matter.

FIG. 8 schematically illustrates a hydraulic vehicle clutch system 601 according to FIG. 1 incorporated into the rear differential assembly 622. Only the clutches 610, 612, the actuators 618, 619, the on-demand variable displacement pump 631, the purge valve 632, the reservoir 634 and the fluid lines are illustrated, with the remainder of the clutch system 601 omitted for clarity. It should be noted that the control system 200 can include the actuators 618, 619, the pump 631, the purge valve 632, the reservoir 634, the fluid lines 620, 626, 637, the motor 636, the pressure sensor 638, the ECU 640 and the PCU 642, as described above.

The on-demand variable displacement pump 631 can enhance the performance of the vehicle 10 when the drivetrain of the vehicle 10 is placed in the on-demand all-wheel drive mode. When the control system 200 engages the high range drive ratio of the two-speed final drive assembly 30, the control system 200 can place the pump 631 of the rear differential assembly 622 in the high displacement setting. This can permit rapid movement of the piston(s) 618b, 619b (see, for example, FIG. 1) to modulate the torque transmitted by the clutch(es) 610, 612 to the rear wheel(s) 26L, 26R (see, for example, FIG. 7) in response to transient driving conditions. When the control system 200 engages the low range drive ratio of the two-speed final drive assembly 30, the amount of torque input to the rear differential assembly 622 can increase substantially. Thus, the control system 200 can place the pump 631 of the rear differential assembly 622 in the low displacement setting. This can permit a substantial increase in pressure to the piston(s) 618b, 619b which, in turn, can effectively increase the torque transmitted to the rear wheel(s) 26L, 26R via the clutch(es) 610, 612. Thus, the torque transmission capacity of the rear differential can be maximized without increasing the size of the motor 631, the pistons 618b, 619b, and/or the friction plates 613, 615 (see, for example, FIG. 1). As a result, the weight and packaging size of the rear differential can be minimized for the target torque capacity.

Returning to FIG. 7, the control system 200 can include the ECU 640 (or ECUs 640a, 640b) and/or the PCU 642 of the hydraulic vehicle clutch system 601. In this exemplary arrangement, actuation of the hydraulic vehicle clutch system 601 can be interlinked with the actuation of the two-speed final drive assembly 30 such that operation of the actuation devices 618, 619 complements the selection of the low range drive ratio or the high range drive ratio. Alternatively, the control system 200 can select the low range drive ratio or the high range drive ratio independently of the operation of the actuation devices 618, 619 of the rear differential assembly 622, and vice versa.

The control system 200 can include the hydraulic circuit components of any clutch system 601 described above, the ECU 640 (or ECUs 640a, 640b), the PCU 642, an actuator 202, a vehicle speed sensor 204, an accelerator pedal position sensor 206 and an electronic control unit (ECU) 208 in electrical communication with each of the actuator 202, the vehicle speed sensor 204, the accelerator pedal position sensor 206, and at least one of the ECU 640 (or ECUs 640a, 640b) and the PCU 642.

Based on signals received from each of the sensors 204, 206, the ECU 208 can output a control signal to the actuator 202 to move the actuator 202 between a low range position where the actuator 202 couples the low range drive ratio in series with a selected one of the reverse drive ratio and the plurality of forward drive ratios and a high range position where the actuator 202 couples the high range drive ratio in series with the selected one of the reverse drive ratio and the plurality of forward drive ratios. The signals from the sensors 204, 206 also can be sent to the ECU 640 (or ECUs 640a, 640b) and/or the PCU 642 of the rear differential assembly 622.

The actuator 202 can include any known actuator, such as an electrical actuator, a magnetic actuator, an electro-mechanical actuator, an electro-magnetic-mechanical actuator or an electro-hydraulic actuator. The actuator 202 can be coupled to a clutch (not shown) or other known torque transmission coupling device. The clutch can cause engagement of the selected one of the low range drive ratio and the high range drive ratio in series with selected one of the reverse drive ratio and the plurality of forward drive ratios. The actuator 202 can be a component of the two-speed final drive assembly 30 and at least the clutch can be mounted within the housing 36, as is disclosed in the above-referenced co-pending U.S. patent application Ser. No. 12/847,639.

The vehicle speed sensor 204 can be a wheel speed sensor, a shaft speed sensor, or other known sensor capable of measuring data usable to determine the real-time travel speed of the vehicle. For example, the vehicle speed sensor 204 could be a sensor used to obtain data for a speedometer.

The accelerator pedal position sensor 206 can be any known sensor capable of measuring movement and/or the relative location of an accelerator pedal of the vehicle. For example, the accelerator pedal position sensor can be a sensor used in a vehicle drive-by-wire system that can control the speed of the internal combustion engine 14.

The ECU 208 can be referred to as a central processing unit (CPU) or as a controller. The ECU 208 can be dedicated to the two-speed final drive assembly 30. Alternatively, the ECU 208 can control the multi-ratio transmission 28 and/or the internal combustion engine 14 in addition to the two-speed final drive assembly 30. If the ECU 208 is dedicated to the two-speed final drive assembly 30, then the ECU 208 can be in electrical communication with an ECU(s) for the internal combustion engine and/or the multi-ratio-transmission. In another alternate embodiment, the ECU 208 can be combined with the ECU 640 (or ECUs 640a, 640b), and/or the PCU 642 into a single ECU.

The control system 200 can further include a manual override switch 210 in electrical communication with the ECU 208. The manual override switch 210 can enable the driver to disable automatic control of the actuator 202 by the ECU 208 and cause the actuator 202 to move to the low range position and engage the low range drive ratio. In addition, the override switch 210 can include another position that overrides the ECU 208 and causes the actuator 202 to move to the high range position and engage the high range drive ratio (thus, permitting the drivetrain to operate in the low range drive ratio only when either manually actuated by the override switch 210 or automatically actuated when the override switch 210 is placed back to the automatic position).

The ECU 208 can be configured with hardware alone, or to run software, that permits the ECU 208 to receive, store and process data from the sensors. The ECU 208 can be configured with hardware alone, or to run software, that calculates the real-time vehicle acceleration based on real-time vehicle speed data provided to the ECU 208 by the vehicle speed sensor 204. Alternatively, the vehicle speed sensor 204 could be a smart sensor configured with hardware alone, or to run software, that calculates the real-time vehicle acceleration and outputs the acceleration data to the ECU 208.

Although the exemplary embodiments depicted by FIG. 7 can rely on vehicle speed, accelerator pedal position, and vehicle acceleration as inputs for the selection between the low range drive ratio and the high range drive ratio, other vehicle operation parameters can be used as inputs, such as torque converter slippage, longitudinal orientation of vehicle, lock up clutch actuation, etc. These other parameters can be used in addition to, or in place of, any combination of the vehicle speed, the accelerator pedal position, and the vehicle acceleration.

The ECU 208 can automatically select, without direct input from the driver, which one of the low range drive ratio and the high range drive ratio may be best suited for the given vehicle operation parameters. Exemplary subroutines that can be built into the hardware or executed when running the software are disclosed in co-pending U.S. patent application. Ser. No. 12/847,673, entitled "Control System and Method for Automatic Selection of a Low Range Gear Ratio for a Vehicle Drivetrain", filed concurrently herewith, and incorporated in its entirety herein by reference.

The transaxle 12 can be configured such that it is accommodated within the engine compartment (not shown) of the vehicle 10. Accordingly, the passenger compartment of the vehicle 10 need not accommodate the transaxle 12. However, other drivetrain components can be used in place of the transaxle 12, such as a two-speed transfer case mounted under the floor of the passenger compartment with the multi-ratio transmission 28 intermediate the power source and the transfer case.

The transaxle 12 can include a housing 36 in which the multi-ratio transmission 28 and a front differential (not shown) for the front wheels 18R, 18L are mounted, as is known in the art. See, for example, U.S. Pat. No. 4,974,473, referenced above. The housing 36 can also contain the two-speed drive assembly 30 and the power take-off assembly 32.

The drivetrain can be selectively configured as a two-wheel-drive (e.g., front-wheel-drive) drivetrain or an all-wheel-drive drivetrain and can include the transaxle 12, the pair of front driveshafts 16L, 16R, a pair of front wheels 18L, 18R, a propeller shaft 20, the rear differential assembly 622, a pair of rear driveshafts 24L, 24R, and a pair of rear wheels 26L, 26R.

Each of the driveshafts 16L, 16R, 24L, 24R can extend in a transverse direction (indicated by arrows T) of the vehicle 10. The rear driveshafts 24L, 24R can be spaced from the front driveshafts 16L, 16R in a longitudinal direction (indicated by arrows L) of the vehicle 10—which direction is perpendicular to the transverse direction T. Each of the front driveshafts 16L, 16R can be connected to and driven by the transaxle 12. Each of the rear driveshafts 24L, 24R can be connected to and driven by the respective drive axles 616 (FIG. 8) of the rear differential assembly 622 in any manner known in the art.

The left front wheel 18L can be connected to and driven by the left front driveshaft 16L. The right front wheel 18R can be connected to and driven by the right front driveshaft 16R. The left rear wheel 26L can be connected to and driven by the left rear driveshaft 24L, and the right rear wheel 26R can be connected to and driven by the right rear driveshaft 24R.

Each of the internal combustion engine 14 and the transaxle 12 can be oriented with their output shafts (not shown) in the transverse direction T of the vehicle 10. However, this orientation can be varied without departing from the scope of the disclosed subject matter, and can include a perpendicular orientation between the engine output shaft and transaxle output shaft. The internal combustion engine 14 can be connected to the transaxle 12 to drive the transaxle 12 in a manner known in the art.

The propeller shaft 20 can extend in the longitudinal direction L of the vehicle 10 and can be connected to each of the transaxle 12 and the rear differential assembly 622. The propeller shaft 20 can be driven by the transaxle 12 and can drive the rear differential assembly 622.

Returning to FIG. 8, the rear differential assembly 622 can include an input gear 454, a rear final drive gear 456, and a planetary gear assembly 650. The input gear 454 can be configured as a pinion gear and the final drive gear 456 can be configured as a crown gear. The input gear 454 and the final drive gear 456 can be configured as hypoid gears and can input torque from the propeller shaft 20 to the planetary gear assembly 650 in a manner known in the art. The planetary gear assembly 650 can output torque from the final drive gear 456 to the clutches 610, 612 in a manner known in the art. Alternatively, the planetary gear assembly 650 can be omitted from the rear differential assembly 622 and the clutches 610, 612 can be operated individually, as described above, in order to provide differential speed control between the rear driveshafts 24L, 24R (which can correspond to drive axles 616 of FIG. 1). A differential housing 652 can contain all or any combination of the above mentioned components of the rear differential assembly 622.

Although FIG. 8 illustrates a clutch system 601 in accordance with FIG. 1 described above incorporated into the rear differential assembly 622, any one of the exemplary clutch systems 601 described above can be incorporated into the rear differential assembly 622. In addition, the specific configuration and components of the differential assembly 622 can vary a great deal in accordance with the current level of skill in the art.

Figure 9:
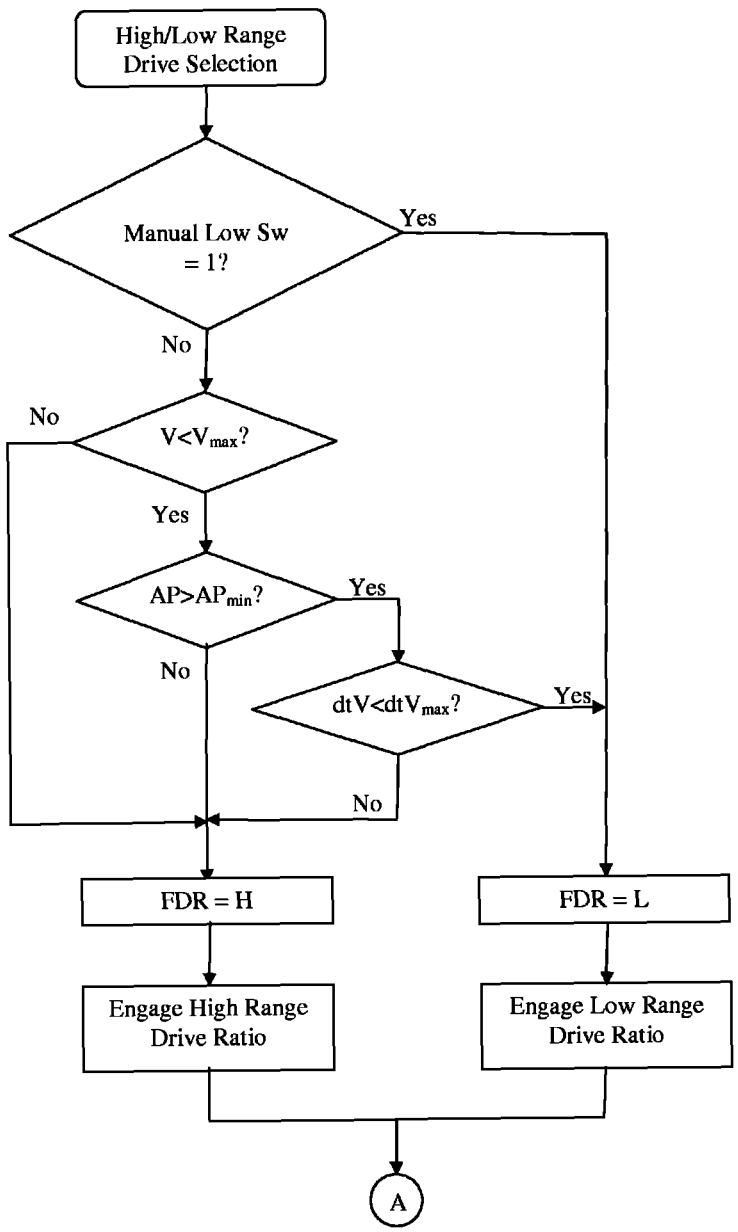
FIGS. 9 and 10 are flow diagrams illustrating a process flow for the vehicle drivetrain of FIG. 7.
Figure 10:
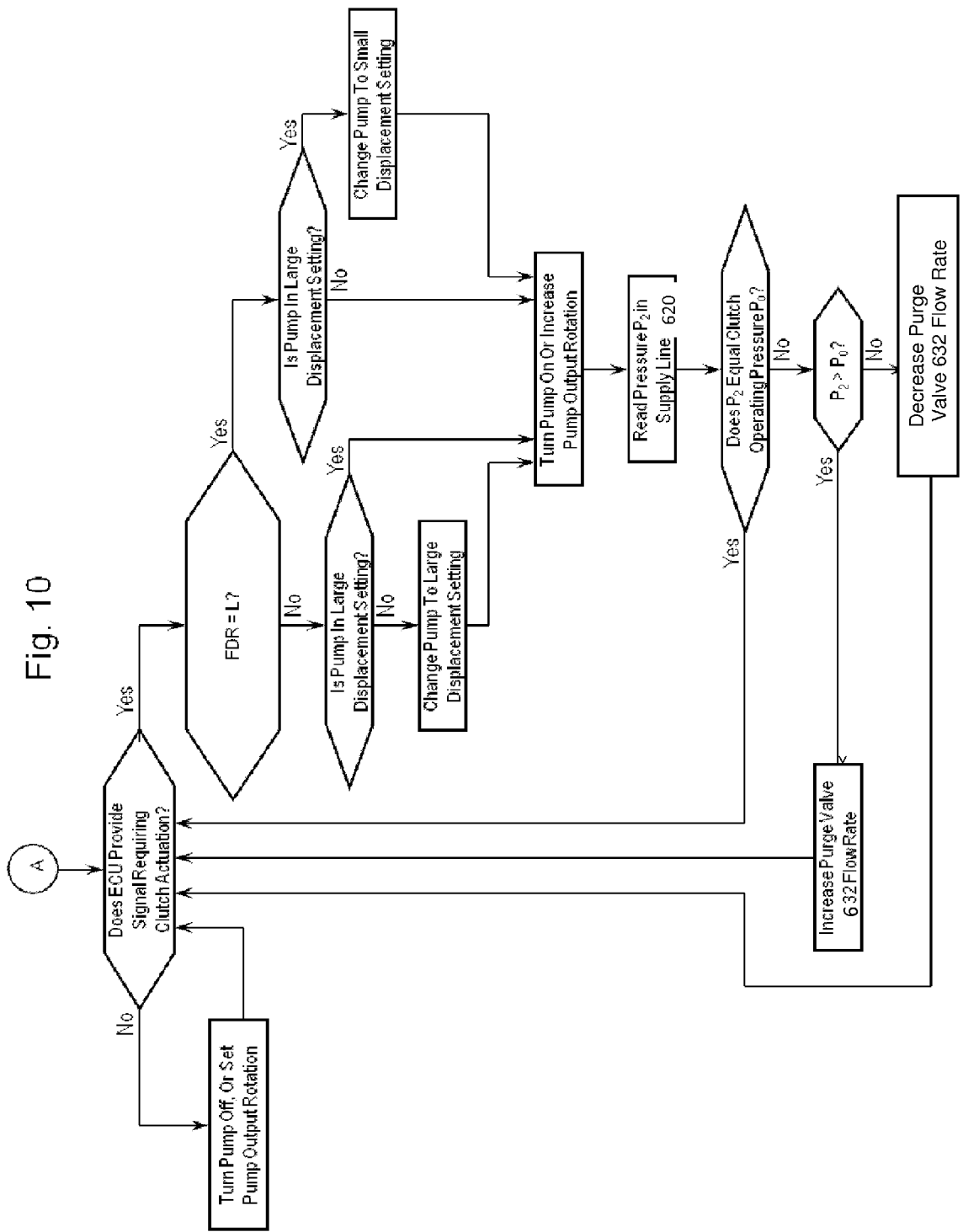

FIGS. 9 and 10 illustrate a flow diagram for a process flow for actuation of the two-speed final drive assembly 30 and the rear differential assembly 622 by the control system 200. This exemplary flow diagram shows a system that can enhance the advantage(s) of the two-speed final drive assembly with the advantage(s) of the hydraulic vehicle clutch system 601 when incorporated into the rear differential assembly 622.

In FIG. 9, the ECU 208 can begin a subroutine to determine and effect the selection of the high range drive ratio or the low range drive ratio. First, the ECU 208 can determine if the manual override switch 210 has been actuated by the driver. If the manual override switch has been actuated (i.e., Manual Low Sw has a value of 1), then the ECU 208 can select the low range drive ratio (i.e., FDR=L) and signal the actuator 202 to engage the low range drive ratio. The ECU 208 can then proceed to the subroutine outlined in FIG. 10 to effect control of the rear differential assembly 622.

If the ECU 208 determines that the manual override switch 210 has not been actuated by the driver (i.e., Manual Low Sw≈1), then the ECU 208 can begin automatic selection of the high range drive ratio or the low range drive ratio. First, the ECU 208 can compare the actual vehicle speed V with a threshold speed $V_{max}$. If the actual vehicle speed V is greater than or equal to the threshold speed $V_{max}$, then the ECU 208 can select the high range drive ratio (i.e., FDR=H) and can signal the actuator 202 to engage the high range drive ratio. The ECU 208 can then proceed to the subroutine outlined in FIG. 10 to effect control of the rear differential assembly 622.

If the ECU 208 determines that the actual vehicle speed V is less than the threshold speed $V_{max}$, then the ECU 208 can determine if the actual accelerator pedal position AP is greater than a threshold position $AP_{min}$. If the actual accelerator pedal position AP is less than or equal to the threshold position $AP_{min}$, then the ECU 208 can select the high range drive ratio (i.e., FDR=H) and can signal the actuator 202 to engage the high range drive ratio. The ECU 208 then can proceed to the subroutine outlined in FIG. 10 to effect control of the rear differential assembly 122.

If the ECU 208 determines that the actual pedal position AP is greater than the threshold position $AP_{min}$, then the ECU 208 can determine if the actual vehicle acceleration dtV is less than a threshold acceleration $dtV_{max}$. If the ECU 208 determines that the actual vehicle acceleration dtV is greater than or equal to the threshold acceleration $dtV_{max}$, then the ECU 208 can select the high range drive ratio (i.e., FDR=H) and can signal the actuator 202 to engage the high range drive ratio. The ECU 208 then can proceed to the subroutine outlined in FIG. 10 to effect control of the rear differential assembly 622.

If the ECU 208 determines that the actual vehicle acceleration dtV is less than the threshold acceleration $dtV_{max}$, then the ECU 208 can select the low range drive ratio (i.e., FDR=L) and can signal the actuator 202 to engage the low range drive ratio. The ECU 208 can then proceed to the subroutine outlined in FIG. 10 to effect control of the rear differential assembly 622.

After the ECU 208 has selected the appropriate one of the high range drive ratio and the low range drive ratio, the ECU 208 can signal the ECU 640 (or ECUs 640*a*, 640*b*) to begin control of the rear differential in accordance with the process flow outlined in FIG. 10. The ECU 208 can also send a signal indicative of the selected drive ratio to the ECU 640 (or ECUs 640*a*, 640*b*).

As shown in FIG. 10, the ECU 640 (or ECUs 640*a*, 640*b*) can first determine whether to actuate one or both clutches 610, 612. If the ECU 640 (or ECUs 640*a*, 640*b*) determine that at least one of the clutches 610, 612 is to be actuated, the ECU 640 (or ECUs 640*a*, 640*b*) can determine whether the ECU 208 has selected the low range drive ratio. If the ECU 640 (or ECUs 640*a*, 640*b*) determine that the low range drive ratio has been selected (i.e., FDR=L), then the ECU 640 (or ECUs 640*a*, 640*b*) can determine whether the on-demand variable displacement pump 631 (or pumps 631*a*, 631*b*) are set to the large displacement setting. The remainder of the process flow of FIG. 10 is described above with reference to FIG. 2.

If the ECU 640 (or ECUs 640*a*, 640*b*) determines that the ECU 208 has selected the high range (i.e., FDR≈L), then the ECU 640 (or ECUs 640*a*, 640*b*) can determine whether the on-demand variable displacement pump 631 (or pumps 631*a*, 631*b*) is set to the large displacement setting. The remainder of the process flow of FIG. 10 is described above with reference to FIG. 2.

It should be noted that the power take-off assembly 32 can include a clutch that can selectively couple the power-take-off assembly 32 to the two-speed final drive assembly 30. As a result, the rear differential assembly 622 can be driven only when the power-take-off assembly 32 engages the two-speed final drive assembly 30. In such a configuration, the control system 200 will follow the process flow outlined in FIGS. 9 and 10 after the power-take-off assembly 32 has been engaged with the two-speed final drive assembly 30.

While certain embodiments of the invention are described above, it should be understood that the invention can be embodied and configured in many different ways without departing from the spirit and scope of the invention. For example, although the purge valve is described as a variable-type linear solenoid valve, other types of valves can be used without departing from the spirit and scope of the invention. For example, pneumatic valves or hydraulic valves could replace the solenoid valve. In addition, other electronically controlled valves could be used, such as servo-valves, spring valves, duty controlled valves, other types of linear and non-linear solenoid valves, etc. With regard to the pump, a typical hydraulic fluid pump can be used, including oil pump, etc. A motor can be used for each pump, or a single motor can be used to drive two or more pumps (as shown in the embodiment of FIG. 2). However, if a single motor is used, respective dynamic control of the hydraulic pressure in each of the hydraulic circuits can be accomplished by varying the purge valve(s). The motor can be an electric motor, a pneumatic motor, hydraulic motor, or other type of power unit. Any of the components can be configured to be actively controlled by the ECU 640 or other control system.

The clutches can be used in any combination of front wheels, rear wheels, front and real wheels, all wheels, etc. The hydraulic lines connecting the various components of the hydraulic circuits can be separate lines that are attached by fittings to the valve, clutch, pump, etc. In the alternative, the hydraulic lines can be built into an existing vehicle drive train structure, such as the front or rear differential, transmission, etc. In such a case, the lines can be machined or molded directly into the casing of the differential, transmission, or other structure.

In addition, the clutches need not be of the multi-plate wet clutch variety. For example, centrifugal clutches, diaphragm clutches, hydraulic clutches/viscous clutches, single plate clutches, and other clutch types could be incorporated into the system of the disclosed subject matter without departing from the spirit and scope.

As discussed in detail above, the pressure P1 or P3 (depending on whether providing standby or active pressure) in the pump line 620 can be substantially the same along its entire length. In addition, the pressure P2 in the piston line 610a can be substantially the same along its entire length. It should be noted that the pressure is considered to be substantially the same in each of these lines, respectively, even though there are certain minor variations caused by head loss, friction loss, etc., in each of the hydraulic circuit lines. The pressure in any given portion of the hydraulic circuit is substantially changed by operating structures that are configured to either act upon or to be acted upon by a hydraulic fluid resulting in a change of pressure of the hydraulic fluid. These operating structures include but are not limited to pumps, valves, pistons/cylinders, turbines, vanes, accumulators, regulators, change-over valves, heat exchangers, etc.

In addition, while the ECU 640 (or ECUs 640a, 640b) and PCU 642 are described as receiving and outputting signals to control motor rotation and valve actuation, the ECU 640 (or ECUs 640a, 640b) and PCU 642 can also control (and/or indirectly control) through the use of other variables that are measured in the system, including fluid pressures, fluid flow, clutch torque transfer rates, etc.

While the subject matter has been described in detail with reference to exemplary embodiments thereof, it will be apparent to one skilled in the art that various changes can be made, and equivalents employed, without departing from the scope of the invention. All related art references discussed above are hereby incorporated by reference in their entirety.

What is claimed is:

1. An apparatus for transferring torque from a vehicle drive train to a wheel of a vehicle, comprising:
   a clutch having a driven part and a driving part;
   a hydraulic system configured to actuate the clutch by placing the driven part into engagement with the driving part, the hydraulic system including operating structures that are configured to either act upon or be acted upon by a hydraulic fluid, the operating structures including:
      a piston configured to move the driven part into engagement with the driving part when an operating hydraulic fluid pressure is supplied to the piston,
      an on-demand variable displacement pump configured to supply the operating hydraulic fluid pressure to the first piston, the on-demand variable displacement pump being configured to be operable in a large displacement setting and a small displacement setting, and
      a purge valve connected in fluid communication with the pump and the piston;
   and the apparatus further comprising:
   a controller configured to control at least one of the on-demand variable displacement pump and the purge valve to manipulate the operating hydraulic pressure to the piston, the controller being configured to: 1) determine whether the operating hydraulic fluid pressure is greater or less than a maximum operating pressure of the pump when operating at the large displacement setting, 2) send a signal to operate the pump at the small displacement setting if the operating hydraulic fluid pressure is greater than the maximum operating pressure, and 3) send a signal to operate the pump at the large displacement setting if the operating pressure hydraulic fluid is less than the maximum operating pressure.

2. The apparatus of claim 1, wherein the controller is configured to operate the on-demand variable displacement pump at a first output pressure that is greater than the operating hydraulic pressure of the piston, and to operate the purge valve to reduce pressure of the hydraulic fluid to the operating hydraulic pressure before the hydraulic fluid reaches the piston when the on-demand variable displacement pump is operating at the first output pressure.

3. The apparatus of claim 2, wherein the controller is configured to operate the on-demand variable displacement pump at a second output pressure when the piston is not actuated such that the hydraulic fluid continues moving through the hydraulic system such that the hydraulic fluid provides cooling to at least a portion of the apparatus.

4. The apparatus of claim 1, further comprising:
   a second clutch having a second driven part and a second driving part,
   wherein the hydraulic system is configured to actuate the first and second clutch by placing the first and second driven parts into engagement with the first and second driving parts, respectively,
   the operating structures further including a second piston configured to move the second driven part into engagement with the second driving part when an operating hydraulic fluid pressure is supplied to the second piston,
   the purge valve connected in fluid communication with the pump and the first and second pistons; and
   the controller being configured to control at least one of the on-demand variable displacement pump and the purge valve to manipulate the operating hydraulic pressure to the first and second pistons.

5. The apparatus of claim 1, wherein the hydraulic system is devoid of an accumulator.

6. The apparatus of claim 1, wherein the purge valve is a variable-type linear solenoid valve.

7. A rear differential assembly for distributing torque to at least one rear wheel of a vehicle, comprising:
   an input member;
   first and second output members;
   an apparatus for transferring torque from a vehicle drive train to a wheel of a vehicle according to claim 1, the apparatus configured to selectively couple the input member to at least one of the first and second output members, the apparatus for transferring torque further including,
      a second clutch including a second driven part and a second driving part, each of the driven part and the second driven part connected to the input member, and the second driving part selectively engageable with the second driven part and the first and second driving parts connected to the first and second output members, respectively, and
      a second piston configured to displace the second driving part into engagement with second driven part;
   wherein at least one of the piston and second piston are in fluid communication with the on-demand variable displacement pump; and
   wherein the controller is further configured to operate at least one of the on-demand variable displacement pump and the purge valve to manipulate a fluid pressure supplied to the at least one of the piston and second piston.

8. The rear differential assembly of claim 7, wherein the controller is configured to signal the on-demand variable displacement pump to operate at a first large displacement setting or at a second small displacement setting.

9. The apparatus of claim 1, further comprising:
a second clutch including a second driven part and a second driving part;
a second piston selectively engageable with the second driving part and configured to displace the second driving part into engagement with the second driven part;
a second on-demand variable displacement pump; and
a second purge valve, wherein the second purge valve and the second piston are in fluid communication with the second on-demand variable displacement pump,
wherein the controller is configured to operate at least one of the second on-demand variable displacement pump and the second purge valve to manipulate fluid pressure supplied to the second piston by the second on-demand variable displacement pump.

10. The apparatus of claim 9, further comprising:
a motor connected to each of the on-demand variable displacement pump and the second on-demand variable displacement pump, wherein the controller is configured to manipulate the speed of the motor.

11. The apparatus of claim 9, further comprising:
a first motor connected to the on-demand variable displacement pump and a second motor connected to the second on-demand variable displacement pump, wherein the controller is configured to independently manipulate the speed of each of the first motor and the second motor.

12. The apparatus of claim 1, further comprising:
a second clutch including a second driven part and a second driving part;
a second piston selectively engageable with the second driving part and configured to displace the second driving part into engagement with the driven part; and
a second purge valve, wherein the second purge valve and the second piston are in fluid communication with the on-demand variable displacement pump, wherein
the controller is configured to operate at least one of the on-demand variable displacement pump, the purge valve, and the second purge valve to manipulate fluid pressure supplied to at least one of the first piston and the second piston by the on-demand variable displacement pump.

13. The rear differential assembly of claim 7, wherein the input member includes at least one of a pinion gear, a bevel gear, and a planetary gear assembly.

14. The rear differential assembly of claim 7, further comprising:
a housing and a fluid reservoir, wherein the housing contains the input member, the driven part and the second driven part, the driving part and the second driving part, the piston and the second piston, the on-demand variable displacement pump, the purge valve, and the fluid reservoir.

15. A drivetrain for a vehicle comprising:
a multi-ratio transmission includes a plurality of forward drive ratios and a reverse drive ratio;
a two-speed final drive assembly connected in series with the multi-ratio transmission and including a low speed final drive ratio and a high speed final drive ratio; and
a rear differential assembly driven by the two-speed final drive assembly and including:
an input member;
first and second output members;
an apparatus for transferring torque from a vehicle drive train to a wheel of a vehicle according to claim 1, the apparatus selectively coupling the input member to at least one of the first and second output members, the apparatus for transferring torque further including,
a second clutch including a second driven part and a second driving part, each of the driven part and the second driven part connected to the input member, and the second driving part selectively engageable with the second driven part and the first and second driving parts connected to the first and second output members, respectively, and
a second piston configured to displace the second driving part into engagement with second driven part;
wherein at least one of the piston and second piston are in fluid communication with the on-demand variable displacement pump; and
wherein the controller is further configured to operate at least one of the on-demand variable displacement pump and the purge valve to manipulate a fluid pressure supplied to the at least one of the piston and second piston.

16. The drivetrain of claim 15, wherein the controller assembly is configured to:
select one of the low range final drive ratio and the high range final drive ratio;
operate the two-speed final drive assembly in the selected one of the low range final drive ratio and the high range final drive ratio; and
signal the on-demand variable displacement pump to operate in one of a high displacement setting and a low displacement setting.

17. The drivetrain of claim 16, wherein the controller assembly is configured to:
select the low displacement setting when the controller assembly selects the high range drive ratio; and
select the high displacement setting when the controller assembly selects the high range drive ratio.

18. The drivetrain of claim 15, further comprising:
a transaxle housing, wherein the multi-ratio transmission and two-speed final drive assembly are contained in the transaxle housing and are oriented in a transverse direction of the vehicle;
a pair of driveshafts connected to the two-speed drive assembly and extending in the transverse direction; and
a propeller shaft driven by the two-speed final drive assembly, connected to the input member, and extending in a longitudinal direction of the vehicle, where the longitudinal direction is perpendicular to the transverse direction, wherein
the output members extend in the transverse direction.

19. The drivetrain of claim 15, wherein the input member includes at least one of a pinion gear, a bevel gear, and a planetary gear assembly.

20. The drivetrain of claim 15, further comprising:
a transaxle housing including the multi-ratio transmission and the two-speed final drive assembly, wherein
the rear differential assembly includes a differential housing and a fluid reservoir, and the differential housing contains the input member, the driven part and the second driven part, the driving part and the second driving part, the piston and the second piston, the on-demand variable displacement pump, the purge valve, and the fluid reservoir.

21. A method for controlling torque distribution in a vehicle comprising:
providing a drivetrain for the vehicle in accordance with claim 15;
selecting one of the low range drive ratio and the high range drive ratio;
engaging the selected one of the low range drive range ratio and the high range drive ratio; and operating at least one of the on-demand variable displacement pump and the purge valve to manipulate a fluid pressure supplied to the piston.

22. The method of claim 21, further comprising:
selecting the low displacement setting when the low range drive ratio is selected.

23. The method of claim 22, further comprising:
selecting at least one of the low displacement setting and the high displacement setting when the high range drive ratio is selected.

24. The method of claim 21, further comprising:
determining a required operating pressure, by the use of the controller, for the on-demand variable displacement pump; and
simultaneously varying fluid output of the purge valve and varying an output characteristic of the variable displacement pump to obtain the required operating pressure.

* * * * *